United States Patent
Slater et al.

(10) Patent No.: US 7,870,200 B2
(45) Date of Patent: Jan. 11, 2011

(54) MONITORING THE FLOW OF MESSAGES RECEIVED AT A SERVER

(75) Inventors: Charles S. Slater, Sunnyvale, CA (US); Paul J. Clegg, Pacifica, CA (US); Brennan H. Evans, Burlingame, CA (US); Peter Schlampp, San Francisco, CA (US)

(73) Assignee: Ironport Systems, Inc., San Bruno, CA (US)

( * ) Notice: Subject to any disclaimer, the term of this patent is extended or adjusted under 35 U.S.C. 154(b) by 1120 days.

(21) Appl. No.: 11/139,090

(22) Filed: May 27, 2005

(65) Prior Publication Data

US 2006/0059238 A1 Mar. 16, 2006

Related U.S. Application Data

(60) Provisional application No. 60/575,658, filed on May 29, 2004.

(51) Int. Cl.
G06F 15/16 (2006.01)
G06F 15/173 (2006.01)
G06F 17/40 (2006.01)

(52) U.S. Cl. .................. 709/206; 709/207; 709/224; 702/187

(58) Field of Classification Search .............. 709/206, 709/224
See application file for complete search history.

(56) References Cited

U.S. PATENT DOCUMENTS

| 5,319,776 | A | 6/1994 | Hile et al. |
| 5,623,600 | A | 4/1997 | Ji et al. |
| 5,646,982 | A | 7/1997 | Hogan et al. |
| 5,802,178 | A | 9/1998 | Holden et al. |

(Continued)

FOREIGN PATENT DOCUMENTS

WO  WO 01/67330 A1  9/2001

(Continued)

OTHER PUBLICATIONS

SpamAssassin: http://web.archive.org/web/20040202050055/au.spamassassin.org/index.html.*

(Continued)

*Primary Examiner*—Saleh Najjar
*Assistant Examiner*—Robert Shaw
(74) *Attorney, Agent, or Firm*—Hickman Palermo Truong & Becker LLP

(57) ABSTRACT

An approach for monitoring electronic messages received at a server is disclosed. Message information for a plurality of electronic messages received at the server is determined and stored in a queue. Based on the queue, aggregate information is generated for a particular network address of a plurality of network addresses. The aggregate information is generated for each time interval of a plurality of time intervals and displayed for the plurality of time intervals. In some implementations, input from a user is received, and based on the input, a modification is made regarding how future electronic messages from the particular network address are handled by the server. In some implementations, combined aggregate information is generated for two or more network addresses and then displayed. In some implementations, aggregate policy information indicating which policies have been applied to the electronic messages is generated and displayed for the time intervals.

33 Claims, 5 Drawing Sheets

U.S. PATENT DOCUMENTS

| | | | |
|---|---|---|---|
| 5,805,810 A | 9/1998 | Maxwell | |
| 5,828,881 A * | 10/1998 | Wang | 719/314 |
| 5,832,208 A * | 11/1998 | Chen et al. | 726/24 |
| 5,850,388 A * | 12/1998 | Anderson et al. | 370/252 |
| 5,889,943 A | 3/1999 | Ji et al. | |
| 5,915,087 A | 6/1999 | Hammond et al. | |
| 5,933,416 A | 8/1999 | Schenkel et al. | |
| 5,937,162 A | 8/1999 | Funk et al. | |
| 5,958,005 A | 9/1999 | Thorne et al. | |
| 5,966,685 A | 10/1999 | Flanagan et al. | |
| 5,968,176 A | 10/1999 | Nessett et al. | |
| 5,983,270 A | 11/1999 | Abraham et al. | |
| 5,983,350 A | 11/1999 | Minear et al. | |
| 5,999,967 A | 12/1999 | Sundsted | |
| 6,003,084 A | 12/1999 | Green et al. | |
| 6,052,709 A * | 4/2000 | Paul | 709/202 |
| 6,072,942 A * | 6/2000 | Stockwell et al. | 709/206 |
| 6,073,142 A | 6/2000 | Geiger et al. | |
| 6,073,154 A | 6/2000 | Narasimhan et al. | |
| 6,073,165 A | 6/2000 | Narasimhan et al. | |
| 6,119,236 A | 9/2000 | Shipley | |
| 6,131,110 A | 10/2000 | Bates et al. | |
| 6,151,491 A | 11/2000 | Farris et al. | |
| 6,161,130 A | 12/2000 | Horvitz et al. | |
| 6,161,185 A | 12/2000 | Guthrie et al. | |
| 6,192,114 B1 | 2/2001 | Council | |
| 6,195,587 B1 | 2/2001 | Hruska et al. | |
| 6,212,558 B1 | 4/2001 | Antur et al. | |
| 6,226,670 B1 | 5/2001 | Ueno et al. | |
| 6,233,618 B1 | 5/2001 | Shannon | |
| 6,266,664 B1 | 7/2001 | Russell-Falla et al. | |
| 6,266,692 B1 | 7/2001 | Greenstein | |
| 6,282,565 B1 | 8/2001 | Shaw et al. | |
| 6,289,105 B1 | 9/2001 | Murota | |
| 6,321,264 B1 * | 11/2001 | Fletcher et al. | 709/224 |
| 6,321,267 B1 * | 11/2001 | Donaldson | 709/229 |
| 6,330,590 B1 | 12/2001 | Cotten | |
| 6,341,309 B1 | 1/2002 | Vaid et al. | |
| 6,393,568 B1 | 5/2002 | Ranger et al. | |
| 6,408,336 B1 | 6/2002 | Schneider et al. | |
| 6,415,313 B1 | 7/2002 | Yamada et al. | |
| 6,421,709 B1 | 7/2002 | McCormick et al. | |
| 6,434,600 B2 | 8/2002 | Waite et al. | |
| 6,453,327 B1 | 9/2002 | Nielsen | |
| 6,460,010 B1 * | 10/2002 | Hanes et al. | 702/179 |
| 6,460,050 B1 | 10/2002 | Pace et al. | |
| 6,484,203 B1 * | 11/2002 | Porras et al. | 709/224 |
| 6,484,261 B1 | 11/2002 | Wiegel | |
| 6,499,021 B1 | 12/2002 | Abu-Hakima | |
| 6,502,131 B1 * | 12/2002 | Vaid et al. | 709/224 |
| 6,507,866 B1 * | 1/2003 | Barchi | 709/207 |
| 6,539,430 B1 | 3/2003 | Humes | |
| 6,584,501 B1 * | 6/2003 | Cartsonis et al. | 709/224 |
| 6,587,550 B2 | 7/2003 | Council et al. | |
| 6,591,291 B1 | 7/2003 | Gabber et al. | |
| 6,609,196 B1 | 8/2003 | Dickinson, III et al. | |
| 6,615,241 B1 * | 9/2003 | Miller et al. | 709/206 |
| 6,628,194 B1 * | 9/2003 | Hellebust et al. | 340/7.5 |
| 6,650,890 B1 | 11/2003 | Irlam et al. | |
| 6,654,787 B1 | 11/2003 | Aronson et al. | |
| 6,675,162 B1 | 1/2004 | Russell-Falla et al. | |
| 6,728,219 B1 * | 4/2004 | Leong et al. | 370/252 |
| 6,732,157 B1 | 5/2004 | Gordon et al. | |
| 6,785,712 B1 * | 8/2004 | Hogan et al. | 709/206 |
| 6,785,732 B1 | 8/2004 | Bates et al. | |
| 6,802,012 B1 * | 10/2004 | Smithson et al. | 726/24 |
| 6,842,772 B1 | 1/2005 | Delaney et al. | |
| 6,854,007 B1 | 2/2005 | Hammond | |
| 6,886,099 B1 * | 4/2005 | Smithson et al. | 726/24 |
| 6,894,981 B1 | 5/2005 | Coile et al. | |
| 6,925,605 B2 * | 8/2005 | Bates et al. | 715/745 |
| 6,941,304 B2 | 9/2005 | Gainey et al. | |
| 6,941,348 B2 * | 9/2005 | Petry et al. | 709/206 |
| 6,981,023 B1 | 12/2005 | Hamilton et al. | |
| 7,024,178 B2 | 4/2006 | Uchimura | |
| 7,024,431 B1 * | 4/2006 | Kornelson et al. | 1/1 |
| 7,072,942 B1 | 7/2006 | Maller | |
| 7,143,159 B1 * | 11/2006 | Grace et al. | 709/224 |
| 7,177,909 B2 | 2/2007 | Stark et al. | |
| 7,181,498 B2 | 2/2007 | Zhu et al. | |
| 7,184,971 B1 | 2/2007 | Ferber | |
| 7,206,814 B2 | 4/2007 | Kirsch | |
| 7,246,121 B2 | 7/2007 | Adar et al. | |
| 7,272,853 B2 * | 9/2007 | Goodman et al. | 726/13 |
| 7,331,061 B1 | 2/2008 | Ramsey et al. | |
| 7,363,569 B2 | 4/2008 | Pendakur et al. | |
| 7,366,761 B2 | 4/2008 | Murray et al. | |
| 7,395,314 B2 | 7/2008 | Smith et al. | |
| 7,409,708 B2 | 8/2008 | Goodman et al. | |
| 7,418,256 B2 * | 8/2008 | Kall et al. | 455/411 |
| 7,428,580 B2 | 9/2008 | Hullfish et al. | |
| 7,490,128 B1 | 2/2009 | White et al. | |
| 7,543,052 B1 * | 6/2009 | Cesa Klein | 709/224 |
| 7,577,736 B1 * | 8/2009 | Ovenden | 709/224 |
| 7,627,670 B2 | 12/2009 | Haverkos | |
| 2001/0005885 A1 | 6/2001 | Elgamal et al. | |
| 2001/0032137 A1 | 10/2001 | Bennett et al. | |
| 2001/0039593 A1 | 11/2001 | Hariu | |
| 2002/0004908 A1 | 1/2002 | Galea | |
| 2002/0015403 A1 * | 2/2002 | McConnell et al. | 370/352 |
| 2002/0016824 A1 | 2/2002 | Leeds | |
| 2002/0059418 A1 * | 5/2002 | Bird et al. | 709/224 |
| 2002/0105545 A1 * | 8/2002 | Carter et al. | 345/752 |
| 2002/0120600 A1 | 8/2002 | Schiavone et al. | |
| 2002/0120705 A1 | 8/2002 | Schiavone et al. | |
| 2002/0133469 A1 | 9/2002 | Patton | |
| 2002/0144154 A1 | 10/2002 | Tomkow | |
| 2002/0152399 A1 * | 10/2002 | Smith | 713/200 |
| 2002/0160757 A1 | 10/2002 | Shavit et al. | |
| 2002/0165902 A1 * | 11/2002 | Robb et al. | 709/202 |
| 2002/0169954 A1 | 11/2002 | Bandini et al. | |
| 2002/0181703 A1 * | 12/2002 | Logan et al. | 380/30 |
| 2002/0184315 A1 | 12/2002 | Earnest | |
| 2002/0184533 A1 | 12/2002 | Fox | |
| 2002/0194490 A1 * | 12/2002 | Halperin et al. | 713/200 |
| 2002/0199095 A1 * | 12/2002 | Bandini et al. | 713/151 |
| 2003/0014490 A1 * | 1/2003 | Bates et al. | 709/206 |
| 2003/0028580 A1 | 2/2003 | Kucherawy | |
| 2003/0050988 A1 * | 3/2003 | Kucherawy | 709/206 |
| 2003/0055724 A1 | 3/2003 | Battin et al. | |
| 2003/0069933 A1 | 4/2003 | Lim et al. | |
| 2003/0074411 A1 | 4/2003 | Nale | |
| 2003/0079142 A1 | 4/2003 | Margalit et al. | |
| 2003/0088824 A1 | 5/2003 | Ayan | |
| 2003/0093689 A1 | 5/2003 | Elzam et al. | |
| 2003/0097591 A1 | 5/2003 | Pham et al. | |
| 2003/0105800 A1 | 6/2003 | Cullen | |
| 2003/0110224 A1 | 6/2003 | Cazier et al. | |
| 2003/0115485 A1 | 6/2003 | Milliken | |
| 2003/0134621 A1 | 7/2003 | Yabe et al. | |
| 2003/0149726 A1 | 8/2003 | Spear | |
| 2003/0158905 A1 | 8/2003 | Petry et al. | |
| 2003/0167402 A1 * | 9/2003 | Stolfo et al. | 713/200 |
| 2003/0172050 A1 | 9/2003 | Decime et al. | |
| 2003/0172291 A1 | 9/2003 | Judge et al. | |
| 2003/0191969 A1 * | 10/2003 | Katsikas | 713/201 |
| 2003/0210649 A1 | 11/2003 | Bondi | |
| 2003/0225850 A1 | 12/2003 | Teague | |
| 2003/0233418 A1 | 12/2003 | Goldman | |
| 2003/0233420 A1 | 12/2003 | Stark et al. | |
| 2004/0003255 A1 | 1/2004 | Apvrille et al. | |
| 2004/0019651 A1 | 1/2004 | Andaker | |
| 2004/0024632 A1 | 2/2004 | Perry | |
| 2004/0054498 A1 * | 3/2004 | Shipp | 702/182 |

| | | |
|---|---|---|
| 2004/0054742 A1 | 3/2004 | Gruper et al. |
| 2004/0054886 A1 | 3/2004 | Dickinson et al. |
| 2004/0054917 A1 | 3/2004 | Obrecht et al. |
| 2004/0058673 A1 | 3/2004 | Irlam et al. |
| 2004/0064371 A1 | 4/2004 | Crapo |
| 2004/0064515 A1* | 4/2004 | Hockey ................... 709/206 |
| 2004/0068542 A1 | 4/2004 | Lalonde et al. |
| 2004/0073617 A1 | 4/2004 | Milliken et al. |
| 2004/0083230 A1 | 4/2004 | Caughey |
| 2004/0083372 A1* | 4/2004 | Williamson et al. ......... 713/188 |
| 2004/0093384 A1 | 5/2004 | Shipp |
| 2004/0103159 A1* | 5/2004 | Williamson et al. ......... 709/206 |
| 2004/0111381 A1 | 6/2004 | Messer et al. |
| 2004/0111507 A1* | 6/2004 | Villado et al. ............... 709/224 |
| 2004/0111632 A1* | 6/2004 | Halperin ..................... 713/200 |
| 2004/0117648 A1 | 6/2004 | Kissel |
| 2004/0133561 A1 | 7/2004 | Burke |
| 2004/0148493 A1* | 7/2004 | Chu et al. ................... 712/214 |
| 2004/0167968 A1 | 8/2004 | Wilson et al. |
| 2004/0177120 A1* | 9/2004 | Kirsch ........................ 709/206 |
| 2004/0186891 A1* | 9/2004 | Panec et al. ................. 709/206 |
| 2004/0199529 A1* | 10/2004 | Clark et al. ................. 707/100 |
| 2004/0199592 A1* | 10/2004 | Gould et al. ................ 709/206 |
| 2004/0199595 A1 | 10/2004 | Banister et al. |
| 2004/0210422 A1* | 10/2004 | Takahashi et al. ........... 702/189 |
| 2004/0215977 A1 | 10/2004 | Goodman et al. |
| 2004/0250127 A1* | 12/2004 | Scoredos et al. ............ 713/201 |
| 2004/0250134 A1 | 12/2004 | Kohler et al. |
| 2004/0260922 A1 | 12/2004 | Goodman et al. |
| 2005/0005107 A1 | 1/2005 | Touboul |
| 2005/0010644 A1 | 1/2005 | Brown et al. |
| 2005/0010660 A1* | 1/2005 | Vaught ....................... 709/223 |
| 2005/0033812 A1 | 2/2005 | McCarthy et al. |
| 2005/0060295 A1 | 3/2005 | Gould et al. |
| 2005/0060643 A1 | 3/2005 | Glass et al. |
| 2005/0064850 A1 | 3/2005 | Irlam et al. |
| 2005/0071485 A1 | 3/2005 | Ramagopal |
| 2005/0080856 A1* | 4/2005 | Kirsch ........................ 709/206 |
| 2005/0080857 A1 | 4/2005 | Kirsch et al. |
| 2005/0081059 A1* | 4/2005 | Bandini et al. .............. 709/206 |
| 2005/0091319 A1* | 4/2005 | Kirsch ........................ 709/206 |
| 2005/0108518 A1 | 4/2005 | Pandya |
| 2005/0182959 A1 | 8/2005 | Petry et al. |
| 2005/0193429 A1 | 9/2005 | Demopoulos et al. |
| 2005/0198155 A1 | 9/2005 | Zakharoff |
| 2005/0198518 A1 | 9/2005 | Kogan et al. |
| 2005/0203994 A1 | 9/2005 | Palmer et al. |
| 2005/0204012 A1* | 9/2005 | Campbell .................... 709/206 |
| 2005/0246440 A1 | 11/2005 | Yu |
| 2005/0265319 A1 | 12/2005 | Clegg et al. |
| 2005/0283837 A1 | 12/2005 | Olivier et al. |
| 2006/0116162 A1 | 6/2006 | Desai et al. |
| 2006/0168006 A1* | 7/2006 | Shannon et al. ............. 709/206 |
| 2007/0201496 A1 | 8/2007 | Motoyama |
| 2008/0104186 A1 | 5/2008 | Wieneke et al. |
| 2008/0104187 A1 | 5/2008 | Wilson et al. |
| 2008/0209347 A1 | 8/2008 | Malik et al. |
| 2008/0256072 A1 | 10/2008 | Logan et al. |
| 2008/0270540 A1 | 10/2008 | Larsen |
| 2009/0019126 A1 | 1/2009 | Adkins |

FOREIGN PATENT DOCUMENTS

| | | |
|---|---|---|
| WO | WO 02/25464 A1 | 3/2002 |
| WO | WO 02/39356 A1 | 5/2002 |
| WO | WO 02/019069 A | 7/2002 |

OTHER PUBLICATIONS

I R O N P O R T Messaging Gateway Appliances: http://web.archive.org/web/20030421095627/http://ironport.com/ http://web.archive.org/web/20030405102438/www.senderbase.com/ http://web.archive.org/web/20030724022036/www.ironport.com/pdf/ironport_c60_brochure.pdf.*

CAPSA—Packet Inspector: http://web.archive.org/web/20030118183455/http://www.javvin.com/packet.html http://web.archive.org/web/20030416233408/http://javvin.com/packet.html.*

Microsoft Computer Dictionary, Fifth Edition ( May, 2002) ISBN-10: 0-7356-1495-4 ISBN-13: 978-0-7356-1495-6.*

Evan Harris, GreyListing Whitepaper, (2003) http://projects.puremagic.com/greylisting/whitepaper.html.*

Roderick W. Smith, Advanced Linux Networking, Addison Wesley Professional (Jun. 2002) ISBN-10: 0-201-77423-2 ISBN-13: 978-0-201-77423-8.*

The American Heritage® Dictionary of the English Language—definition "aggregate".*

BrightMail Anti-Spam 4.0 Data Sheet (2002).*

BrightMail Anti-Virus 4.0 Data Sheet (2002).*

International Searching Authority, "Notification of Transmittal of the International Search Report and the Written Opinion of the International Searching Authority, or the Declaration," PCT/US05/19143, Dated Apr. 7, 2006, 8 pages.

Current Claims, PCT/US05/19143, 24 pages.

Wong, J. 1998. Preventing Spams and Relays. Linux J. 1998, 56es (Dec. 1998), 7 pages.

Ironport Messaging Gateway Appliances: http://web.archive.org/web/2000421095627/http://ironport.com/ http://web.archive.org/web/20030405102438/www.senderbase.com/ http://web.archive.org/web/20030724022036/www.ironport.com/pdf/ironport_c60_brochure.pdf, dated Dec. 2008, 17 pages.

R. Hiden, ed., Applicability Statement for the Implementation of Classless Inter-Domain Routing (CIDR), RFC 1517, Sep. 1993, 4 pages.

Y. Rekhter & T. Li, eds., An Architectre for IP Address Allocation with CIDR, RFC 1518, Sep. 1993, 27 pages.

International Searching Authority, "Notification of transmittal of the international search report and the written opinion of the international searching authority, or the declaration," International Application No. PCT/US05/19037, dated Oct. 24, 2005, 10 pages.

Current claims, PCT/US05/19037, 12 pages.

International Searching Authority, "Notification of transmittal of the international search report and the written opinion of the international searching authority, or the declaration," International Application No. PCT/US05/18569, dated Oct. 17, 2005, 10 pages.

Current claims, PCT/US05/18569, 7 pages.

International Searching Authority, "Notification of Transmittal of the International Search Report and the Written Opinion of the International Searching Authority, or the Declaration," PCT/US04/00969, Aug. 18, 2004, 10 pages. (Reference on CD-ROM).

Current Claims in PCT patent application, International Application No. PCT/US03/37417, 16 pages. (Reference on CD-ROM).

Current Claims in International Application, application No. PCT/US04/00969, 19 pages. (Reference on CD-ROM).

International Searching Authority, "Notification of Transmittal of the International Search Report or the Declaration," PCT/US03/37417, Jun. 8, 2004, 7 pages. (Reference on CD-ROM).

Kent, Stephen T., "Internet Privacy Enhanced Email," Communications of the ACM, vol. 36, No. 8, Aug. 1993, pp. 48-60. (Reference on CD-ROM).

MIMEsweeper 2.0 Press Release, "Integralis releases MIMEsweeper Version 2.0 with SMTP mail security support," [online], Jan. 15, 1996, [retrieved on Jun. 8, 2004]Retrieved from the internet: http://web.archive.org/web/19961112103826/www.nha.com/re120.htm (Reference on CD-ROM).

"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm (Reference on CD-ROM).

International Searching Authority, "Notification of transmittal of the international search report and the written opinion of the international searching authority, or the declaration," international application No. PCT/US2005/005498, dated May 12, 2005, 12 pages. (Reference on CD-ROM).

Current Claims, PCT/US2005/005498, 14 pages. (Reference on CD-ROM).

Kephart, Jeffrey O., et al., "Biologically Inspired Defenses Against Computer Viruses", International Joint Conference on Artificial Intelligence, 1995, 12 pages.

Christenson, Nick, "Sendmail Performance Tuning", Pearson Education, Inc., 2003, 56 pages.

Costales, Brian, et al., "Sendmail, 3rd Edition", O'Reilly and Associates, ISBN: 1-56592-839-3, 2003, 61 pages.

Wong, "Preventing Spams and Relays", Linux, 1998, Dec. 1998, 7 pages.

Spam Assassin, retrieved from http://web.archive.org, retrieved Dec. 2008, 60 pages.

Ironport, "Messaging Gateway Appliances", http://web.archive.org, Dec. 2008, 14 pages.

Microsoft, "Microsoft Computer Dictionary", Fifth Edition, May 2002, 7 pages.

Smith, Roderick, W., "Advanced Linux Networking", Addison Wesley Professional, Jun. 2002, 62 pages.

Mertz, David, "Spam Filtering Techniques", Aug. 2002, 8 pages.

Nick Christenson, "sendmail Performance Tuning", Pearson Education, Inc. (2003).

Bryan Costales, with Eric Allman, "sendmail, 3rd Edition", O'Reilly & Associates (2003) ISBN: 1-56592-839-3, p. 2-3, 10-11, 15-17 105, 265-70, 298-299, 440-45, 450-51, 458-59, 464-71, 478-9, 1022, 1064-69.

Viega et al., Mailman: The GNU Mailing List Manager, USENIX Technical Program, in: Proceedings of the 12th Systems Administration Conference (LISA '98), 1998.

Joe Cooper, The Book of Webmin: Or: How I Learned to stop Worrying and Love UNIX (2003), pp. 203-217.

Wong, J. 1998, Preventing Spams and Relays, Linux J. 1998, 56es (Dec. 1998), 10.

\* cited by examiner

MONITORING THE FLOW OF MESSAGES RECEIVED AT A SERVER

PRIORITY CLAIM AND RELATED APPLICATIONS

This application claims domestic priority under 35 U.S.C. §119(e) from prior U.S. provisional application Ser. No. 60/575,658, entitled "PROVIDING TEMPORARY ACCESS TO A NETWORK DEVICE, USING DESTINATION DOMAIN-BASED BOUNCE PROFILES, MONITORING THE FLOW OF MESSAGES FROM SENDERS, AND CONTROLLING THE FLOW OF MESSGES FROM SENDERS," filed May 29, 2004, naming Paul J. Clegg, Charlie S. Slater, R. Brian Harrison, Lonhyn Jasinskyj, Ben Cottrell, Eric Huss, Craig Sprosts, Krishna Srinivasan, Peter Schlampp, Shun Chen, Robert Brahms, Daniel Quinlan, and Brennan H. Evans as inventors, the entire disclosure of which is hereby incorporated by reference for all purposes as if fully set forth herein.

This application is related to: (1) co-pending non-provisional application Ser. No. 11/140,314, filed May 27, 2005, entitled "MANAGING CONNECTIONS AND MESSAGES AT A SERVER BY ASSOCIATING DIFFERENT ACTIONS FOR BOTH DIFFERENT SENDERS AND DIFFERENT RECIPIENTS," naming Paul J. Clegg, Eric Huss, Craig Sprosts, Shun Chen, Robert Brahms, and Daniel Quinlan as inventors, and (2) co-pending non-provisional application Ser. No. 11/139,114, filed May 27, 2005, entitled "MANAGING CONNECTIONS, MESSAGES, AND DIRECTORY HARVEST ATTACKS AT A SERVER," naming Paul J. Clegg, Eric Huss, Craig Sprosts, Krishna Srinivasan, Shun Chen, Robert Brahms, and Daniel Quinlan as inventors.

FIELD OF THE INVENTION

The present invention generally relates to processing electronic messages, and more specifically, to monitoring the flow of electronic messages from senders to a server that processes electronic messages.

BACKGROUND

The approaches described in this section are approaches that could be: pursued, but not necessarily approaches that have been previously conceived or pursued. Therefore, unless otherwise indicated, the approaches described in this section are not prior art to the claims in this application and are not admitted to be prior art by inclusion in this section.

Mail transfer agents (MTA's) typically receive a large number of email messages, anywhere from hundreds of messages per hour to hundreds of thousands of messages per hour. Because of the increasing problems of the tremendous volume of unsolicited commercial email (i.e., spam) and from a significant percentage of email messages being infected with viruses, administrators of MTA's would like to be able to monitor the flow of email messages to the MTA's in an easy and efficient manner in order to take steps to deal with spam and virus infected email messages.

However, traditional mail flow monitoring approaches only allow the administrators to see the overall total flow of email messages into the MTA, and these approaches do not allow the administrators to distinguish between email messages that the administrators want to let into the system served by the MTA (e.g., legitimate email messages from the company's partners and customers) from email messages that the administrators want to avoid, such as spam that often comprises the majority of messages being sent to the MTA or virus infected email messages that can cause significant harm to a company's electronic files and systems.

Furthermore, traditional mail flow monitoring approaches require that administrators analyze old, historical mail flow information, which is inconvenient and only allows the administrators to see what has happened in the past. These approaches restrict an administrator's ability to respond to immediate problems.

In addition, such traditional mail flow monitoring approaches require considerable skill and effort by administrators to process the historical data and analyze the aggregated results to determine whether any trends are present that would be of interest, such as identifying spikes in the volume of incoming email messages that may be indicative of spam or a virus outbreak. Even if administrators are able to successfully analyze the historical data, the administrators still must configure the MTA's to change the manner in which future messages will be processed, such as by manually modifying a configuration file, :which can be cumbersome and inconvenient.

Based on the foregoing, it is desirable to provide improved techniques for monitoring of the flow of email messages to an MTA that can enable the administrator of the MTA to distinguish between desirable and undesirable flow of email messages. Furthermore, there is a need for an approach that allows the flow of email messages to be monitored based on more up to date information and that allows an administrator to easily identify patterns and specify actions to be taken based on that information.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Figure 1:
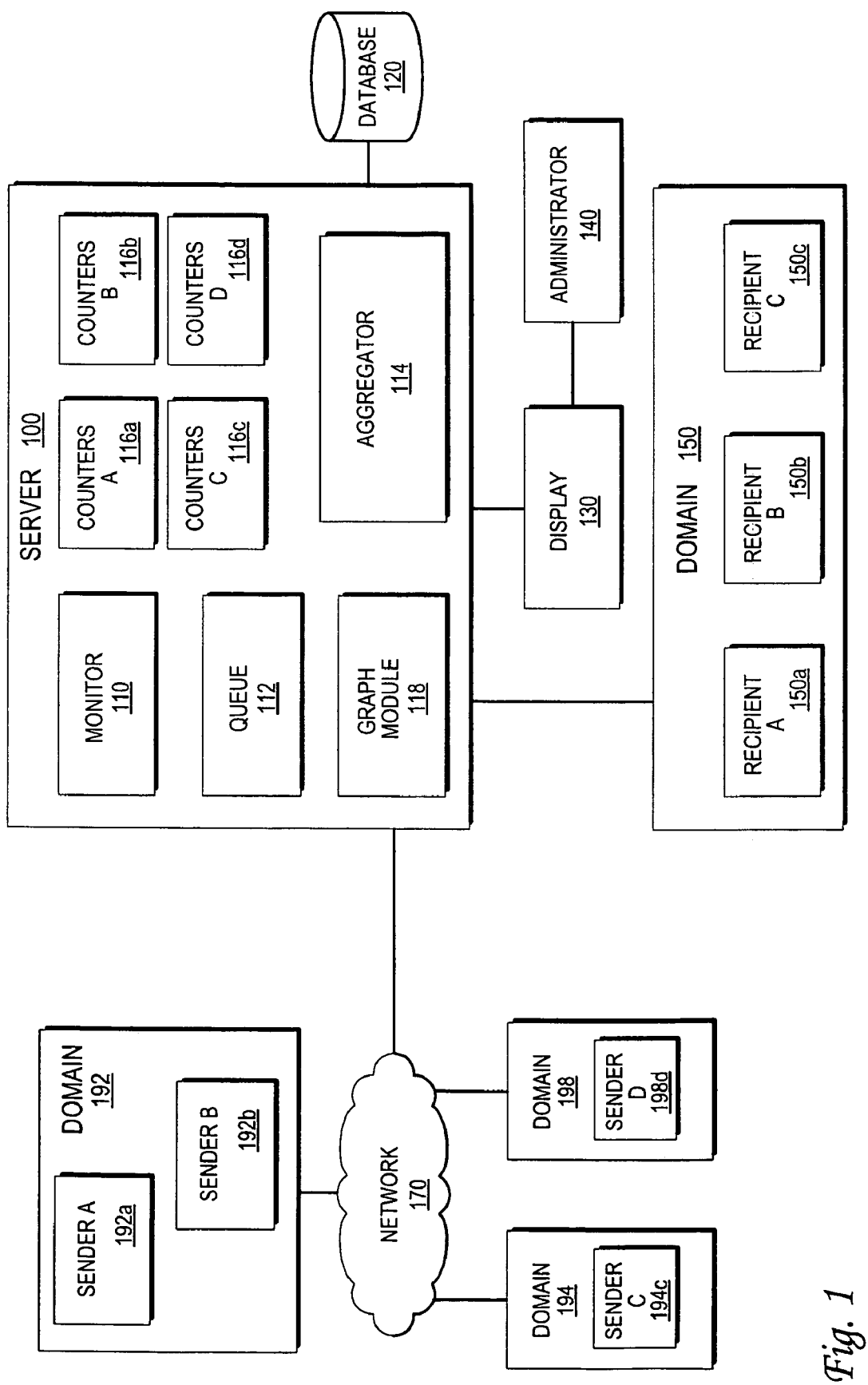
FIG. 1 is a block diagram that depicts a high level overview of a system for monitoring email messages received by a server, according to an embodiment.

A method and apparatus for monitoring email messages receive by a server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. Structural and Functional Overview
   A. Introduction
   B. Structural Overview of Monitoring Email Messages
   C. Functional Overview of Monitoring Email Messages II. Collecting and Aggregating Message Information
   A. Using a Queue to Store Message Information
   B. Types of Counters for Collecting Message Information
   C. Aggregating Message Information for Multiple Network Addresses
   D. Aggregating Message Information for Different Time Intervals III. Displaying and Using Message Information
   A. Generating Message Information Displays
   B. Message Information Display Examples
   C. Identifying Patterns in Message Information Displays
   D. Taking Actions Based on Message Information Displays
   E. Alerts and Alarms Based on Message Information IV. Implementation Mechanisms and Examples
   A. Time Interval Resolution
   B. Intervals and Time Boundaries
   C. Aggregating Reporting Intervals
   D. Managing Counters
   E. Recording Counters
   F. Command Line Interface
   G. Data Structures and Related Definitions
   H. On-Disk Database and Report Generation
   I. Host Access Table (HAT) and Recipient Access Table (RAT)
   J. Managing Information Relating to Electronic Messages
   K. Determining a Reputation Score for a Sender
   L. Controlling Mail Injection
   M. Controlling the Number of Connections Made to a Recipient Domain
   N. Limiting Directory Harvest Attacks
   O. Example System Performance Characteristics V. Hardware Overview
   A. General Hardware Overview
   B. Hardware Examples VI. Extensions and Alternatives I. Structural and Functional Overview A. Introduction Techniques are provided for gathering data about the flow of email messages into a system through a server, such as an MTA, and displaying the data to allow a user to identify patterns in the message flows and thereby take actions based on the identified patterns. For example, as email messages are received by the MTA, message information that includes the different network addresses from which the email messages are received at the MTA can be determined. For each network address, an object in memory is used to store message information for a set of time intervals of a specified time period (e.g., in six 10 second intervals for the current minute).

The impact on the processing and delivery of email messages by the MTA is minimized because only the current interval of the current time period (e.g., the current 10 second interval of the current minute) is updated as messages are received. After the end of each time period, the data for the intervals of the older time periods (e.g., the older minutes) are aggregated by a separate process and written to disk. Based on the message information that has been written to disk by time period (e.g., for each minute), aggregate information for a network address is generated for longer time periods, such as by hour and by day. Note that use of a minute as the specified time period having 10 second intervals is only an example, and any time period having two or more intervals can be used.

The number of messages being received at the MTA from a particular network address, such as an Internet protocol (IP) address, can be tracked and displayed on a graph that is part of a graphical user interface (GUI) presented to a user. The message information displayed to the user can further be aggregated over a group of network addresses, such as a range of IP addresses or a domain name.

The user, such as administrator of the mail server, can inspect the graph to identify any patterns or abnormalities, such as a spike in the incoming flow of email messages from a particular network address. Such an unusual spike in the number of messages being received could indicate that the unusual influx of email messages are unsolicited commercial emails, such as spam, that the user would like to limit. As a result, the administrator would likely determine that some action should be taken to minimize the impact from the influx of potential spam, such as by throttling the rate at which email messages from the particular network address are accepted by the MTA.

The administrator can take action by clicking on the appropriate button in the GUI, such as a "BLACKLIST" button or a "THROTTLE" button, so that selection of one of these buttons causes a modification to the MTA's configuration so that the network address is either added to a blacklist or added to a list of network addresses that are subject to being injection rate limited, respectively. Similarly, if an unusual mail flow pattern is determined to be desirable, such as a spike being caused at a large company when an outside contractor is sending all of the company's employees copies of a press release that the employees should receive, the administrator can click on a "WHITELIST" button to modify the MTA's configuration to allow all such messages to be accepted, thereby avoiding such messages from inadvertently being treated as spam by a later applied spam policy.

In addition, approaches are described that track the application of policies to the flow of messages, such as a spam policy, a virus policy, or more generally any type of action taken for one or more network addresses and display the results plus allow for generation of standard or custom reports. For example, the mail flow monitoring system can present the user with a graphical representation of the mail flow over time for one or more network addresses or for all mail flow into the system, along with a classification of how many of the messages were identified as belonging to one or more categories, such as spam, potentially virus infected, blacklisted, whitelisted, greylisted (e.g., subject to injection control, such as throttling to limit the rate at which email messages are accepted by the MTA), or other categories of treatment or lack thereof.

Mail flow monitoring functions can track a number of different message attributes or characteristics. For example, detailed information can be provided about incoming messages (e.g., the number of messages received or the number of recipients identified in email messages from an IP address), outgoing messages (e.g., the number of messages sent to a particular domain), and processing statistics (e.g., the percentage of messages subject to one or more policies). Other sources can be accessed for data on the email messages, such as the SenderBase service provided by IronPort Systems, Inc., of San Bruno, Calif., that supplies network owner names and global information for a sender profile. Message information can be aggregated and tabular results presented by grouping data on one or more network addresses, domains, network owners, or any other sender identifiers, along with time series data by the same groupings.

Mail flow monitoring can be implemented in a hierarchical fashion, such as at a low level that interacts with a data store or real time data inputs, at a middle level that composes tables and aggregates, and at a high level interface that finalizes the data for presentation to the user, such as through a graphical user interface.

B. Structural Overview of Monitoring Email Messages

FIG. 1 is a block diagram that depicts a high level overview of a system for monitoring email messages received by a server, according to an embodiment. For simplicity, FIG. 1 only depicts a limited number of senders of email messages and recipients of those email messages, although in practice any number of senders and recipients can accommodated by the approaches described herein.

FIG. 1 depicts a server 100 that is communicatively coupled to a network 170 that is also communicatively coupled to domains 192, 194, 198. For example, server 100 can be implemented as an MTA connected to the Internet to which a number of domains are also connected. For simplicity, FIG. 1 depicts only three domains, but in practice there can be any number of domains communicatively coupled to network 170.

As shown in FIG. 1, domain 192 includes a sender A 192a and a sender B 192b, domain 194 includes sender C 194c, and domain 198 includes sender D 198d. However, in practice, each domain can include any number of senders.

Server 100 is communicatively coupled to a display 130 that is used to present information to an administrator 140, such as through a browser-based graphical user interface (GUI). Server 100 is also communicatively coupled to a database 120 that can be used to store information generated as part of a mail flow monitoring process. Finally, server 100 is communicatively coupled to a domain 150 that includes recipients 150a-150c that are identified as a recipient A 150a, a recipient B 150b, and a recipient C 150c.

Server 100 includes a monitor 110, a queue 112, an aggregator 114, a graph module 118, and a set of counters 116a-116d that are identified as counters A 116a, counters B 116b, counters C 116c, and counters D 116d.

Monitor 110 determines connection information for incoming connections to server 100 and message information for email messages received by server 100 from the senders of the email messages. The connection information and message information is stored in a queue 112 that can be subsequently processed by aggregator 114 to aggregate the connection information for connections to server 100 from different senders and to aggregate the message information for the email messages from different servers for recipients serviced by server 100. After the message information for an email message is stored in queue 112, the processing of the email message is performed, and depending on how the email message is processed, the email message may or may not be delivered to the intended recipient in domain 150, such as recipient A 150a, recipient B 150b, or recipient C 150c.

By having monitor 110 store the message information in queue 112 for subsequent processing by aggregator 114, the impact of the monitoring process on the handling of incoming connections and the subsequent flow and processing of email messages by server 100 is minimized. The analysis of the information stored in queue 112 by aggregator 114 may lag the receipt of email messages by server 100 by a relatively short time, such as a few seconds or a couple of minutes, so that the aggregate information produced by aggregator 114 is generated substantially in real time with the receipt of email messages by server 100.

Queue 112 can be implemented in any of a number of ways. For example, server 100 can create a "mailFlowHost" object for each IP address and store the objects in an in-memory dictionary. The key to the dictionary is a tuple containing the remote IP address, local IP address, remote port, and local port. For a current time period, such as the current minute, each mailFlowHost object records message information in 10 second intervals. An in-memory dictionary, referred to as the "current dictionary," stores the information for the current interval. At the end of each 10 second interval, the "old" dictionaries are stored in an interval table, which are represented in FIG. 1 by counters A 116a, counters B 116b, counters C 116c, and counters D 116d.

As message information is obtained from the incoming email messages, monitor 110 gets the mailFlowHost object for the current interval from the current dictionary until the current time minute is over, after which monitor 110 creates new mailFlowHost objects for the next minute, with the current dictionary being used for the current 10 second interval of the next minute in the same fashion. Data from the dictionaries corresponding to old minutes are aggregated and written to disk, such as database 120, and from there the minute data is rolled up into longer time periods, such as hours and days.

The mail flow monitoring approach described herein can track one or more statistics for each sender, such as the number of messages received by server 100 from the sender, the number of recipients for which email messages are received from the sender, the amount of information (e.g., the number of kB) received from the sender, and the number of connections received from the sender. The mail flow monitoring approach described herein can also track the later application of one or more policies to the email messages from the sender, such as how many are blacklisted, whitelisted, or greylisted, or the percentage of messages received from the sender in a particular time period that are determined to be spam or that fail a virus check.

At the end of periodic intervals, such as at the end of every minute, the information in counters A 116a, counters B 116b, counters C 116c, and counters D 116d are aggregated and stored by aggregator 114 in database 120. Then counters A 116a, counters B 116b, counters C 116c, and counters D 116d can be reset to zero or replaced with new sets of counters to count for the next time interval, such as the next minute.

Graph module 118 accesses the data for a set of time intervals that is stored in database 120 and generates one or more graphs or plots to be presented through display 130 so that administrator 140 can review and analyze the data and then specify actions, as appropriate, for the handling of future email messages from a particular sender.

Data stored in database 120 can also be aggregated in any of a number of ways. For example, the data in database 120 can be aggregated over longer time periods, such as by each hour for a day, and presented to administrator 140 by graph module 118 through display 130. Data stored in database 120 can also be aggregated for multiple senders, such as by combining data for sender A 192a and sender B 192b, and then displaying the compiled data on all email received from domain 192 to administrator 140 through display 130.

Server 100 can include other modules, components, and functions than those described with respect to FIG. 1 herein. For example, server 100 can include a spam policy module and a virus policy module for applying spam and virus policies, respectively. Also, the individual components of server 100 as depicted in FIG. 1 can be combined with each other, such as by combining monitor 110 and aggregator 114, or the individual components can be implemented as several different components, such as by implementing aggregator 114 as a time aggregator for aggregating message information over time and a sender aggregator for aggregating message information for two or more senders.

C. Functional Overview of Monitoring Email Messages

Figure 2:
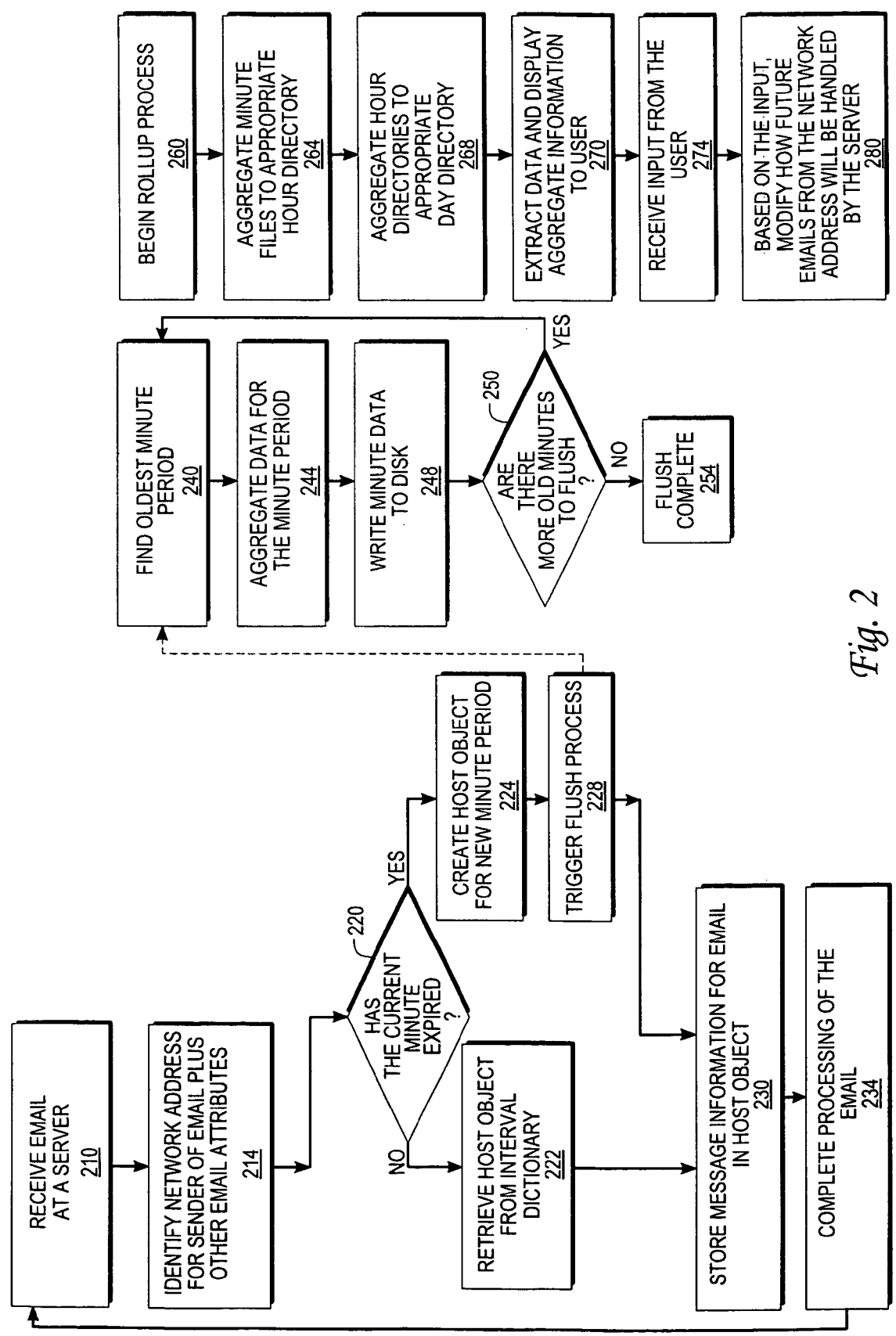
FIG. 2 is a flow diagram that depicts an approach for monitoring email messages received by a server, according to an embodiment.

FIG. 2 is a flow diagram that depicts an approach for monitoring email messages received by a server, according to an embodiment. For explanation purposes, FIG. 2 is described with reference to the system overview of FIG. 1, although the approach of FIG. 2 is not limited to the particular system depicted in FIG. 1. Also, FIG. 2 is described with reference to handling email messages, although any type of electronic message can be used with the approach depicted in FIG. 2.

In block 210, email is received at a server. For example, an email message from sender C 194c and addressed to recipient C 150c is received by server 100.

In block 214, the network address for the sender of the email plus other email attributes are identified. For example, monitor 110 identifies the IP address for sender C 194c based on the header for the received email message. Other information about the email message can also be determined, such as the size of the email and how many recipients at domain 150 are included in the "TO" field of the email.

In block 220, a determination is made as to whether the current minute has expired. For example, a host object can be used for each IP address by server 100 to collect message information. An in-memory dictionary, represented as queue 112 in FIG. 1, is used for the current host objects to track message information. The key to the dictionary is a tuple containing the remote IP address of the sender, the local IP address of server 100, the remote port for the sender, and the local port of server 100 for the connection.

Message information is tracked for a current time period, such as the current minute, and the current time period is broken down into a number of smaller intervals, such as 10 second intervals for the current minute. A dictionary for each 10 second interval is stored in an interval table, with the dictionary for the current 10 second interval referred to as the "current dictionary" and the dictionaries for past second intervals referred to as "old dictionaries."

If in block 220, the current minute period has expired, the process continues to block 244, but if the current minute period has not expired, the process continues to block 222.

In block 222, the host object for the current minute is retrieved. For example, the current dictionary that corresponds to the current 10 second interval of the current minute period and that has the host object for the network address of the sender is retrieved. The process continues to block 230.

In block 224, a host object for the new minute period is created. For example, if the current time indicates that the current minute period corresponding to the current dictionary has elapsed (i.e., the time indicates that the next minute has begun), a new host object and corresponding dictionaries are created to track message information for IP addresses for the next minute.

From block 224, the process continues to block 228, where the flush process is triggered that begins with block 240. For example, if a new host object is created in block 224, that signifies that a new minute period has begun, which allows the message information stored in the old dictionaries for the old minute or minutes to be aggregated in a "flush" process and then written to disk, as described below with respect to block 240. From block 228, the process continues to block 230.

In block 230, the message information for the email in stored in the host object. For example, monitor 110 can store the IP address and other attributes of the email message that are determined in block 214 in the current dictionary (represented by queue 112) for the current 10 second interval of the current minute.

From block 230, the processing of the email is completed in block 234. For example, server 100 can apply one or more policies, such as a spam policy, a virus policy, or any other type of policy to the email message. Depending on the outcome of applying the applicable policies, server 100 may either delete the email, quarantine the email, bounce the email, or forward the email to recipient C 150c. Depending on the configuration of server 100, the results of applying one or more of those policies and the final disposition of the email can also be tracked by server 100 through the use of a corresponding counter.

In block 228, the flush process is triggered. For example, the flush process is triggered after a minute time period has passed, thereby enabling the message information stored in the old dictionaries for that prior minute period (e.g., the old minute) to be aggregated. The flush process begins with block 240.

In block 240, the oldest minute period is found. For example, when the flush process was triggered in block 228, there may be data stored in the old dictionaries for more than just one past minute period, and therefore, the oldest minute is selected to process first.

In block 244, the data for the minute period is aggregated. For example, the old dictionaries for each 10 second interval for the old minute period are used to form a minute summary for the old minute period for each host object. Note that because only old dictionaries are flushed and because only the current dictionary for the current interval is updated, a race condition does not exist and therefore there is no need for locking. Also, by triggering the flush process by the creation of new host objects, the need to use a timeout is eliminated.

In block 248, the minute data is written to disk. For example, the minute summaries generated in block 244 are written to an on-disk queue of files, such as on database 120. As a specific example, the data from each host object can be copied to a fixed-length binary record in an on-disk file, with one file created for each minute.

In block 250, a determination is made whether there are more old minutes to flush. For example, in block 240, there could have been two or more old minutes, so the oldest minute was selected, but now the next oldest minute is to be processed.

If in block 250, there are no more old minutes to flush, the process continues to block 254, which indicates that the flush is complete. However, if in block 250 there are additional old minutes to flush, the process returns to block 240 where the next oldest minute period is found and the flushing process begins again.

In block 260, the rollup process begins. For example, the rollup process takes the minute summaries written to disk in block 248 and aggregates the minute information into longer periods. The rollup process can be triggered in a number of ways, including but not limited to, the expiration of a timeout or by a request. For example, a time counter can be used to implement a timeout so that when the timeout expires, a rollup is performed, thereby allowing for rollups to be made at periodic intervals (e.g., to rollup the data every hour or every day). As another example, the rollup can be initiated in response to a request, such as a query to database 120 for message information that is stored in the minute summary form but has not been aggregated for longer time periods.

In block 264, the minute files are aggregated to an appropriate hour directory. For example, at the expiration of an hourly timeout, the minute files for the past hour can be aggregated and stored in a directory for the corresponding hour.

In block 268, the hour directories are aggregated to an appropriate day directory. For example, at the expiration of a daily timeout, the hour directories for the past day can be aggregated and stored in a directory for the corresponding day. Although not illustrated in FIG. 2, other rollups may be performed, such as for a 12 hour period, by the half hour, or by the week, month, quarter, or year.

In block 270, aggregate information is extracted and displayed to a user. For example, graph module 118 can receive a request from administrator 140 through a GUI interface on display 130 for historical mail flow information for a particular IP address. In response to the request, graph module 118 accesses database 120 to retrieve the requested information for display to administrator 140.

As a specific example, the number of emails received each minute for the last hour can be determined based on the data stored in database 120, and the data is then presented to administrator 140 using display 130. The user can be provided with a graphical display through a GUI of the number of emails received per minute over the course of the last hour. The system can provide administrator 140 with input options for selecting the sender or IP address of interest, the information to be displayed, and the time period over which the information is desired. Note that the GUI can include options for allowing administrator 140 to specify a group of two or more senders for which data is to be displayed, such as the senders associated with a primary domain, a network owner, a range of network addresses, a subnet, a fully qualified domain name (FQDN), a classless inter-domain routing (CIDR) block, an organization, a reputation or reputation score, a subdomain, or any other desired identifier that can be shared by two or more senders. In addition, multiple groupings of senders can be combined and displayed.

In block 274, input from the user is received. For example, along with displaying the number of emails received from sender C 194c over the last hour, the graphical display can include one or more objects that are each associated with one or more actions, such as a "blacklist" button, a "whitelist" button, and a "greylist" button next to the graphical display. By selecting a desired button, administrator 140 can specify how future emails from sender C 194c are to be handled, such as by selecting the "blacklist" button to prevent delivery of future emails from sender C 194c.

In block 280, based on the input received in block 234, a modification is made to how future emails from the network address will be handled by the server. For example, if the user in block 234 selected the "blacklist" button to specify that sender C 194c should be blacklisted, the IP address for sender C 194c is added to the blacklist being used by server 100. As a result, future emails from sender C 194c would not be delivered and instead would be deleted or bounced back, depending on how server 100 is configured to use the blacklist.

II. Collecting and Aggregating Message Information

Data about email messages can be collected by measuring inbound and outbound flows of the email messages, including bytes, recipients, messages, connections, success conditions, failure conditions, and actions taken, such as those specified in a host access table (HAT) and a recipient access table (RAT) and the application of various policies, such as spam and virus policies. The HAT and RAT are described in the implementation mechanisms below.

Typically, such measurements are collected by network address over short time intervals (e.g., 10 second intervals). The data for the intervals are stored in memory in dictionaries and then aggregated over a longer period (e.g., each minute) and then stored to disk. Minute data can then be aggregated further, such as by hour or day. The aggregated message information, whether aggregated by minute, hour, day, or some other time period, can be used to analyze email message traffic over a desired time interval and over multiple network addresses to represent the traffic flow. Reports can be generated based on one or more sender identifiers, such as by the user specifying one or more domain names, network addresses, IP addresses, subnets, ranges of IP addresses, fully qualified domain names, any level domains, CIDR blocks or portions of CIDR blocks, SenderBase organization ID's, or a SenderBase reputation score. SenderBase is described in the Implementation Mechanisms section below.

A. Using a Queue to Store Message Information

As messages are received at a server, one or more attributes of the messages are stored in a queue so that the impact of monitoring the flow of messages at the server is minimized. For example, as each message is received at the server, the network address, size, and number of recipients for the message is determined and collected by an object, such as a mailFlowHost object, for the network address. Additional messages have their attributes stored in other objects that are part of the queue as well. The objects can be grouped into dictionaries, and each dictionary can correspond to one time interval in a longer time period, such as 10 second time intervals in a minute. The dictionary for the current time:interval is called the current dictionary, and the dictionaries for past time intervals are called old dictionaries.

The dictionaries can be keyed in any suitable manner. For example, a tuple containing the remote IP address, local IP address, remote port, and local port can be used. An interval table is used to store the current dictionary and old dictionary. When an email message is retrieved, the monitor 110 can retrieve the current dictionary from interval table, and then the monitor 110 can retrieve the mailFlowHost object for the sender's network address from the current dictionary for updating the message information stored therein based on the email message that has been received by the MTA.

The determination of the message information for messages received at the server is typically performed based on the header information of the message. The determination of the message information is made shortly after initial receipt of the message and before any other message processing, such as the application of a spam detection engine or a virus scanning engine that may ultimately prevent the message from being delivered.

Analysis of the information stored in the queue is performed by one or more modules or threads that are part of the server, or perhaps even by another server with access to the queue. For example, after the end of a current period, such as after the current minute has passed, a "flush" process can be used to aggregate message information from the old dictionaries that correspond to one or more old time periods, such as past minutes.

The result of the flush process for a particular old minute is a summary of the message information by network address for the old minute. The summary can be written to an on-disk queue of files, such as writing the minute summaries to database 120. The flush process copies the message information from each mailFlowHost object to a fixed-length binary record in an on-disk file, with one file being used for each old minute.

Because only old dictionaries are flushed and because only the current dictionary is updated, there is no concern over a race condition occurring and no need for locking because the current dictionary is not used by the flush process, and the flush process is independent of the monitoring process that stores the message information for incoming electronic messages into the current dictionary.

Once the flush process is complete, a separate rollup process can be used to aggregate the information stored on disk into longer time intervals. For example, the minute summaries can be rolled up into hourly summaries and stored in a corresponding hour directory on disk. Similarly, minute or hour data can be rolled up into daily summaries and stored in a corresponding daily directory on disk.

Note that while the examples herein are described in terms of 10 second intervals, minute periods, hours, and days, any desired time intervals, periods, and multiples of the periods can be used. For example, 5 second intervals can be used by the mailFlowHost objects for storing data in the current dictionaries, and old dictionaries can be aggregated and stored on disk for 30 second periods that are latter rolled up to minute periods or longer periods.

As a result of using the queue to store information on email messages as the emails are received at the server, the mail flow monitoring process can be performed with minimal impact on other processing and eventual delivery of the emails, while allowing a near real-time processing of the information in the queue to allow the administrator of the MTA to monitor mail flow information substantially in real time, with a time lag on the order of only 90 seconds in a typical implementation.

B. Types of Counters for Collecting Message Information

Any of a number of different counters can be used for collecting message information about the flow of email messages through the system, and the counters can be based on any kind of sender identifier, such as a network address and other that are described herein. For example, counters can be used to track the actions taken based on rules in the HAT and RAT, such as a counter for the number of recipients that are blocked from a sending IP address based on injection control or the number of connections refused from a domain due to the maximum number of connections being exceeded. As another example, counters can track the number of messages identified by the system as spam, such as by the Brightmail anti-spam engine, or the number of messages determined to be infected with a virus, such as by Sophos anti-virus engine.

In addition, counters can be established for different actions taken based on sender identifiers. For example, one counter can track the number of messages rejected for a CIDR block that is listed for a rule in the HAT, while another counter can track the number of messages rejected for a specified domain name that is listed in the HAT. In general, a counter can be used for any sender identifier listed on the left side of the HAT and RAT and count the number of messages affected by the action or rule specified on the right side of the HAT and RAT.

Each different type of counter can track multiple network addresses, so that a counter tracking the total number of email messages received by the MTA includes information for multiple, or perhaps even all, the network addresses from which the MTA has received email messages during the time interval. Counters can be implemented as a set of objects, such as the mailFlowHost objects described above.

In addition, counters can be grouped together in a "dictionary" for a particular time interval. For example, if the time interval is a 10 second interval and there are five different counters, a "current dictionary" would include all five counters. Upon expiration of the time interval, a new current dictionary is created for the counters. After the end a specified time period, such as after each minute has elapsed, the old dictionaries are aggregated and written to disk, and then the old dictionaries are released. As the message information is summarized for different time periods and written to disk, aggregate directories can be created that aggregate the stored message information over longer time intervals, such as for each hour or for each day, in a separate rollup process.

C. Aggregating Message Information for Multiple Network Addresses

In general, while message information is placed in the queue for each message, and counters are used for different network addresses, counters corresponding to :multiple network addresses can be used and message information for different network addresses can be combined to generate aggregate message information for two or more network addresses. For example, message information can be aggregated for two or more senders based on one or more of the following: a primary domain (described further below), a network owner (described further below), a range of IP addresses, a subnet, a fully qualified domain name (FQDN), a classless inter-domain routing (CIDR) block, an organization (described further below), a reputation or reputation score, a subdomain, or any other attribute that can be shared among two or more senders or network addresses.

As a specific example, message information can be aggregated based on the concept of a "primary domain." For example, yahoo.com, aol.com and honda.co.jp are examples of primary domains that are affiliated with a particular organization, such as Yahoo!, America Online, and Honda of Japan, respectively. By associating individual IP addresses that connect to the system with the corresponding domain name, message information that is collected based on network addresses can be aggregated based on the associated primary domains that are based on some or all of the network addresses associated with the primary domain.

As another specific example, message information can be aggregated based on the network owners for individual network addresses based on a database that includes a mapping of network addresses to network owners, such as the SenderBase service provided by IronPort Systems, Inc., of San Bruno, Calif. For example, when a connection is received from an IP address at the MTA, the system can issue a query to SenderBase to obtain the SenderBase information for the IP address, such as the network owner, SenderBase organization ID, and perhaps even a reputation score. As a result, a network owner that has a many IP addresses that are not otherwise organized in a manner that would allow for the IP addresses to be traced back to the network owner without the use of such a database can have all of the network owner's IP addresses grouped together. Then the system can aggregate, report, and display aggregated message information for the network owner based on some or all of the IP addresses associated with the network owner.

D. Aggregating Message Information for Different Time Intervals

As described above, the processing of message information stored in the queue is performed at periodic intervals, such as over one minute increments resulting in series of one-minute snapshots of the different message attributes tracked by the counters. However, the message information that is aggregated for the single minute snapshots can then be further aggregated over longer periods, such as to provide hourly summaries or daily reports. In general, any level of data, from the lowest level information from the smallest aggregation interval to all data collected, can be reported and displayed to the user.

III. Displaying and Using Message Information

A. Generating Message Information Displays

Message information displays can be generated to include one or more graphs or plots of the data for a set of time intervals so that a user, such as an administrator of an MTA, can review the data to determine what actions, if any, should be taken. For example, block 230 of FIG. 2, displaying the aggregate information to a user, can be performed by graph module 118 of FIG. 1, which in turn can be implemented using a graphics routine, graphics application, or some other suitable graphing mechanism. As a specific example, graph module 118 can obtain input from the user, such as a particular IP address and time period, access the stored data of database 120 for the specified IP address and time period, and generates a plot or graph of the data to be shown on display 130 to administrator 140 of FIG. 1.

The graphical display of the data for a set of time intervals can be generated in any of a number of ways. For example, a graphics application or module can be included in server 100, with the graphics application or module being capable of generating a graphical plot of the data that can be converted into an graphical image to be included in a web-browser shown on display 130. The graphics application or module can be a standalone application or incorporated into one or more applications executing on server 100, and any appropriate standard graphing tool can be used.

As another example, aggregator 114 of FIG. 1 can access the desired data from database 120 and include the data in a web page sent to display 130, in which the web page includes a graphics widget that can generate a plot of the data in the browser window shown to administrator 140.

Using the appropriate graphics module, application, or widget, the user specifies a query to obtain the desired information for a particular type of graphical representation. For example, for a line plot, the user can specify data over a time range, say a few hours, so that there is a sufficient number of data points (e.g., 100-200 data points, such as a data point for every minute) to have a meaningful graphical representation of the data, as with mail flow graph 410 of FIG. 4 that is discussed below. As another example, a small set of individual data points can be represented in a bar plot, with one data point per category or bar, as illustrated by applied policy graph 420 of FIG. 4 that is discussed below. As yet another example, a tabular representation of the data uses one value per row for a particular data category, as in mail flow summary 350 of FIG. 3 that is discussed below.

The data in database 120 can be organized into one or more tables for efficient access to the data. For example, an "IP rollup" table can summarize the data by IP address, whereas a "Domain rollup" table summarizes the database by domain name.

The following are the steps than can be followed for three examples of queries that can be made to database 120 to retrieve data for graphical representation to the user for a company called "Abcd" with a website at "www.abcd.com":

Query 1
  (a) Find the set of IP addresses belonging to "mx1.abcd.com or mx2.abcd.com" for the period X . . . Y that were observed by the server.
  (b) Create a query handle for period X . . . Y from the "IP rollup" table.
  (c) Use "hour" aggregation, but sample every other value when generating the result set.

Query 2
  (a) Find the SenderBase organization ID for "Abcd."
  (b) Create a query handle for period X . . . Y from the "IP rollup" table.
  (c) Query against the "hour" and "minutes" tables but aggregate all results to a single value.

Query 3
  (a) Create a query handle for period X . . . Y from the "Domain rollup" table.
  (b) Filter on "abcd.com".
  (c) Use "hour" aggregation.

B. Graphical User Interface and Message Information Display Examples

Figure 3:
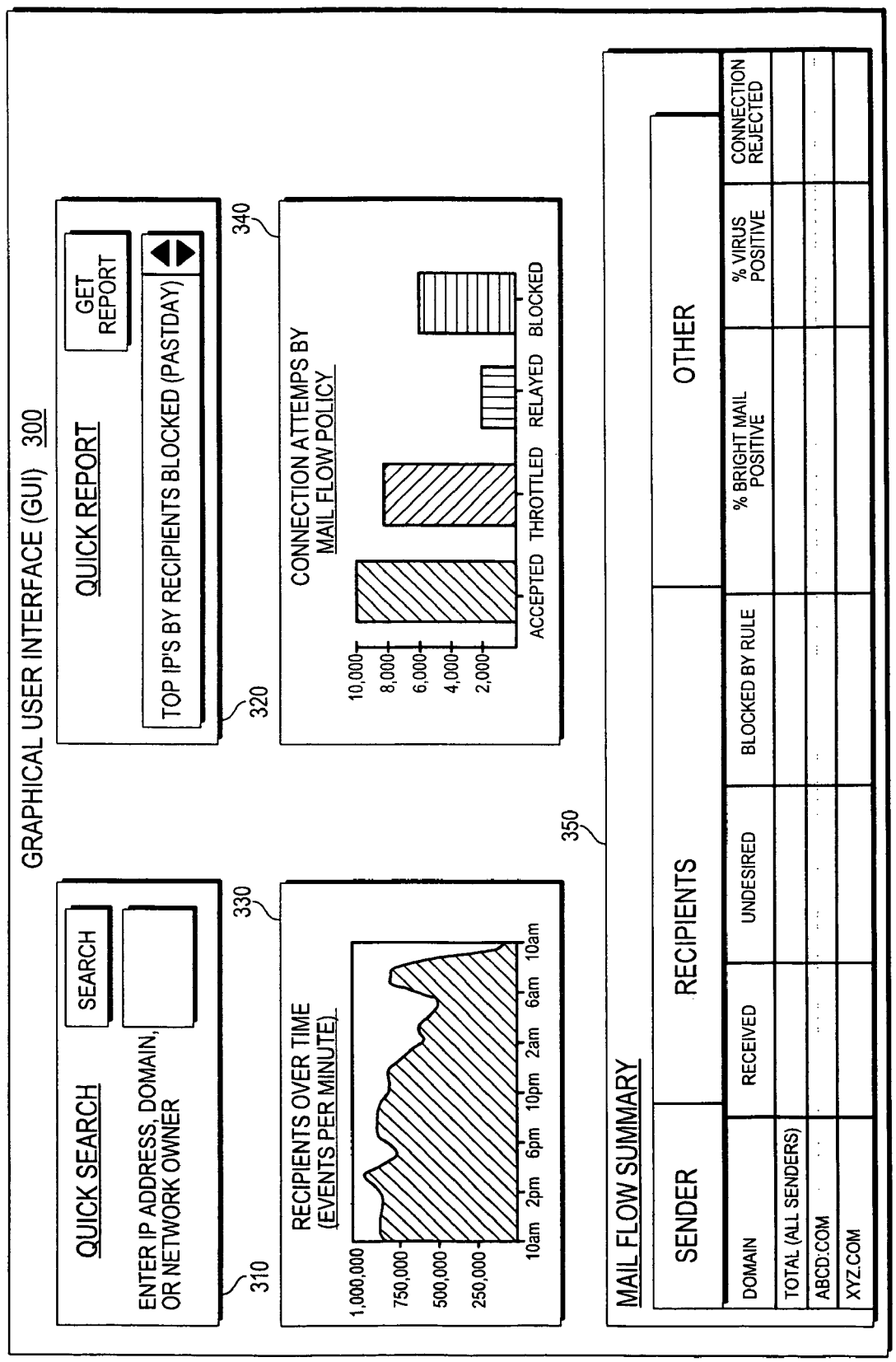
FIG. 3 is a block diagram depicting an example of a graphical user interface for use in monitoring email messages, according to an embodiment.

FIG. 3 is a block diagram depicting an example of a graphical user interface 300 for use in monitoring email messages, according to an embodiment. One or more of the features of graphical user interface 300 can be generated by graph module 118 of FIG. 1, such as by using one of the techniques described above, thereby performing the function of displaying the aggregate information to a user represented by block 230 of FIG. 2.

GUI 300 includes the following representative features: a quick search feature 310, a quick report feature 320, a recipient graph 330, a connection attempt graph 340, and a mail flow summary 350.

Quick search feature 310 allows the user to enter a sender identifier, such as a network address (e.g., IP address), domain, or network owner, into a text input box, following which the user can select the "Search" button to initiate a search on the input provided in the text input box. In response to initiating the quick search, GUI 300 displays results specific to the search criteria, in a format similar to that of GUI 300. In addition, the information for a specific network address or other sender identifier can include one or more buttons adjacent to the recipient graph 330 to allow the user to easily indicate a policy to be applied to the identified network address or sender identifier, such as by clicking on a "Blacklist" button to add the network address to the blacklist being applied by the MTA.

Quick report feature 320 allows the user to select a particular report from a drop down list of predefined reports, such as a report of the "Top IP's by recipients blocked (past day)." The user can use the drop down box to select the desired quick report and then select the "Get Report" button to obtain the desired report. The available Quick Reports can be configured by the manufacturer of the MTA, the administrator of the MTA at the customer location, or a combination thereof.

Recipient graph 330 provides an overview of the number of recipients over the displayed time interval, which is from 10:00 AM of one day to 10:00 AM of the following day in the exampled depicted in FIG. 3. The graph plots the number of recipients per minute over the 24-hour period, thereby indicating to the user how many recipients are identified in the email messages received by the MTA each minute. GUI 300 can include other features not shown in FIG. 3, such as drop down menus in a menu bar, to allow the user to change the time interval for which data is displayed in recipient graph 330, as well as the network address or other sender identifier for which the data is to be displayed.

Connection attempt graph 340 provides a summary of the results of the connection attempts by connection policy, such as whether the connections were accepted, throttled (e.g., the rate at which connections were accepted were limited to be less than a specified rate), relayed (e.g., the connection to the MTA was to relay the email message to another server), or blocked/rejected over a specified time interval. In the example of FIG. 3, the data reflected in connection attempt graph 340 is for the same time period shown in recipient graph 330, namely the 24-hour period from 10:00 AM of one day to 10:00 AM of the next day.

Mail flow summary 350 provides overall email message flow statistics for the MTA along with a breakdown of the total data by a specified type of sender identifier, such as primary domain as depicted in mail flow summary 350. Mail flow summary 350 can provide any of a number of statistics, including but not limited to, the following: the number of email messages received, the number of received email messages that were undesired, the number of email messages that were blocked by a rule (e.g., such as those specified in the HAT and RAT), the percentage of email messages identified as spam by the Brightmail anti-spam engine, the percentage of email messages identified as containing a virus by the Sophos anti-virus engine, and the number of connections rejected/blocked. The user can review the information provided in mail flow summary 350 to determine which senders are injecting the most mail into the MTA, which senders have the most mail blocked by a rule, which senders have the most mail identified as spam or being infected with a virus, and which senders have the most connections rejected.

Figure 4:
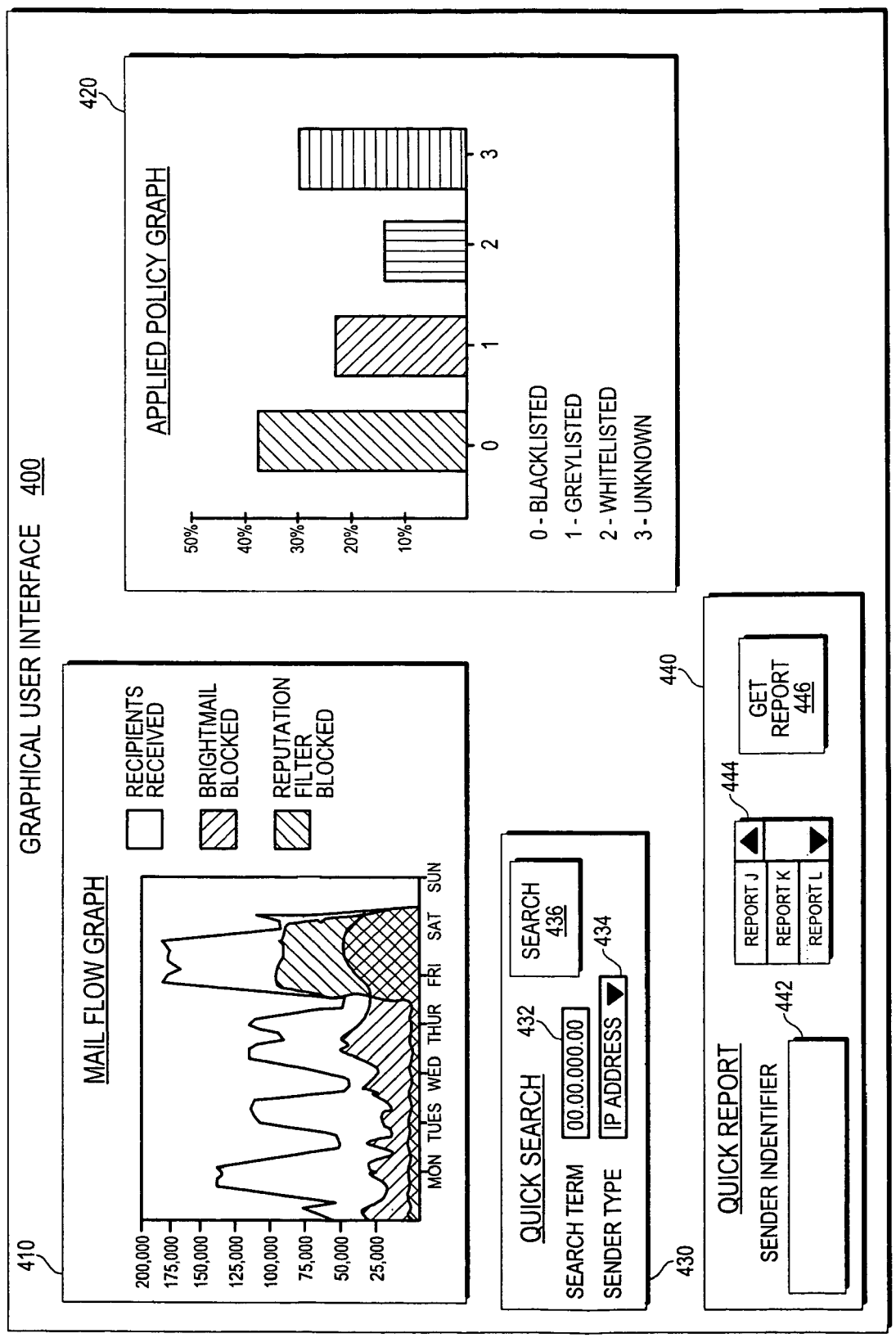
FIG. 4 is a block diagram depicting another example of a graphical user interface for use in monitoring email messages, according to an embodiment.

FIG. 4 is a block diagram depicting another example of a graphical user interface 400 for use in monitoring email messages, according to an embodiment. One or more of the features of graphical user interface 400 can be generated by graph module 118 of FIG. 1, such as by using one of the techniques described above, thereby performing the function of displaying the aggregate information to a user represented by block 230 of FIG. 2.

GUI 400 includes the following representative features: a mail flow graph 410, an applied policy graph 420, a quick search feature 430, and a quick report feature 440.

Mail flow graph 410 depicts the rate at which recipients are being injected into the MTA, how many of the injected recipients are being blocked as spam, such as by using Brightmail, and how many of the injected recipients are being blocked based on a reputation filter, such as by comparing reputation scores. As an example of the latter, reputation scores from a service such as from SenderBase can be used and associated with the incoming email messages, and a filter can specify that only messages having a specified reputation score or greater are to be accepted, while the remaining email messages with unacceptable reputation scores are not accepted for delivery.

As shown in FIG. 4, mail flow graph 410 provides the indicated information for a week's time. Other GUI controls not illustrated in FIG. 4, such as a menu bar with a series of menus containing sets of commands, can allow the user to change the time period for the data to be displayed in mail flow graph 410.

Applied policy graph 420 provides a breakdown of the treatment of the received email messages, such as the percentage of email messages that have been blocked due to a blacklist, the percentage of email messages allowed based on a whitelist, the percentage of email messages that have been subject to injection control (e.g., throttling or graylisting), and the percentage of messages whose disposition is otherwise unknown or not included in the other indicated categories. The message information displayed for applied policy graph 420 corresponds to the same time period displayed in mail flow graph 410.

Quick search feature 430 allows the user to use a sender type object 434 to specify the type of sender identifier to search on (e.g., network address, domain name, subnet, etc.) through a drop down box of available sender identifiers along with a search term object 432. Once the type of sender identifier is selected and the search term entered, the user selects the "Search" button 436 to execute the search and obtain the desired message information for the specified sender identifier.

Quick report feature 440 allows the user to generate a report selected from report listing 44 based on a desired sender identifier that is input to sender identifier object 442. Once the desired report and sender identifier are specified, the user can retrieve the report by clicking on the "Get Report" button 446.

B. Identifying Patterns in Message Information Displays

The use of a GUI for displaying message information based on the flow of email messages in the system, such as in the forms of graphs and tables illustrated in FIG. 3 and FIG. 4, allows the user to identify patterns, such as that a virus attack is underway or a spam campaign has targeted the recipients for the MTA. For example, in FIG. 4, mail flow graph 410 depicts a large increase in the number of recipients blocked based on the reputation filter during Friday and Saturday. The user can then request a report on the IP addresses from which the reputation filter blocked messages were received, and then add some or all of the IP addresses identified thereby to the HAT with an appropriate rule, such as that the selected IP addresses are to be blacklisted or subject to mail injection rate limitations.

As another example, in FIG. 3, recipient graph 330 can include an additional line that indicates the average number of recipients per minute that is based on the message information received over the past thirty days. The additional line can be displayed simultaneously with the current message flow information for the 24-hour period indicated, thereby allowing the user to compare the last day's data to the same data averaged over the previous month. A significant increase in comparing the current information to the previous month's average information may be an indication of a current spam or virus attack. The user can then investigate the details of where the extra email messages are coming from, such as by using mail flow summary 350, and then decide what actions, if any, should be taken.

C. Taking Actions Based on Message Information Displays

In some implementations, the system for displaying message information based on the flow of email messages in the system includes one or more graphical objects, such as buttons or pull down menus, that allow the user to take actions based on the information being displayed. For example, if the display includes a mail flow graph that depicts the number of messages being received over that last six hours from an IP address and that shows an unusually large spike in the number of messages received over the last thirty minutes, the user can click on one or more buttons that cause the system to take a specified action. As a specific example, if the user determines that the spike is likely the result of a virus attack or a hit and run spammer, the user can click on a button on the display labeled "BLACKLIST" to have the IP address showing the spike in messages blacklisted. Such a capability can be referred to as a "one button blacklist" feature.

As another specific example, the user can click on a button labeled "WHITELIST" to have the messages allowed, such as when the user determines the IP address is that of a trusted partner who is unlikely to be the source of virus infected messages or spam. As yet another example, the user can click on a button labeled "GREYLIST" to have the flow of messages from the IP address limited, such as by employing a mail injection control approach (e.g., throttling) to limit the rate at which recipients are injected to the MTA by the IP address. Clicking on the "GREYLIST" button may result in a dialog box being presented to the user to obtain additional information from the user, such as the maximum allow injection rate or an expiration time following which injection control is to no longer be applied.

The system can implement the action represented by the user's use of such graphical objects, such as the buttons described above, by using any one of a number of approaches. For example, when a button is clicked by the user, the system can generate an appropriate rule and add the rule to the HAT or RAT, such as that the identified IP address be blacklisted, whitelisted, or greylisted.

D. Alerts and Alarms Based on Message Information

In some implementations, the mail flow monitoring system can compare message information to thresholds, limits, or other specified values, and generate an alert message to the administrator of the MTA or present an alarm message on a display. For example, the system can compute a thirty day average, such as that the MTA is having 100 recipients/day injected from a particular IP address. The system can then compare the mail flow from the particular IP address for the current day to the thirty-day average. If the difference between the data for the current day and the thirty day average exceeds a specified amount, such as a threshold level of a 500% increase, the system can send an alert message to one or more individuals associated with the MTA and/or display an alarm message on a display associated with the MTA to call attention to the situation.

The alert or alarm that is generated and sent allows the user of the MTA to review the message information about the flow of email messages in the system and take an action. For example, a 500% increase in the number of injected recipients from a particular IP address may indicate a hit and run type of spam campaign, and as a result, the user can take an appropriate action, such as using mail flow injection control to limit the number of recipients being injected to the MTA to a particular amount, such as the thirty day average, or such as blacklisting the IP address for the next several hours.

IV. Implementation Mechanisms and Examples

The following implementation mechanisms are examples of the ways in which the techniques described herein may be implemented. However, a particular implementation can include fewer or more features than are represented by the following examples, and other implementations can include none of the following examples yet still implement the approaches described herein.

A. Time Interval Resolution

In some implementations, the monitoring system manages various counters (inbound and outbound connections, recipients, messages, bytes, and various success and failure conditions) by network address, such as an IP address. Domain name service (DNS) and Senderbase information that is observed by the system can also be recorded by network address and used in report generation. The time interval for the report can be specified in any appropriate increment, such as minutes, hours, days, weeks, months, or years.

For example, the number of minutes specified can range from 1 to 120 and is counted backwards from the most recent minute boundary prior to the current time. As another example, the number of hours specified can range from 1 to 72 and is counted backwards from the most recent hour boundary prior to the current time. Counters related to an inbound simple mail transfer protocol (SMTP) session are recorded at the time the event happens and then aggregated by a background task and converted to a sorted, indexed format suitable for generating reports. Measurement and reporting can be performed on a global basis, while an identifier of the sender that is injecting email to the system (e.g., an "injectorID") and an index into the list of injectors, is recorded in each database record.

Mail flow reports provide options for sorting by any of a number of attributes, including but not limited to, recipients, connections, messages, or bytes received. In some implementations, the number of "top" entries reported is a command option and defaults to ten. In addition, the user can specify a fully qualified domain name (FQDN), any level domain, a network address, an IP address, a range of IP addresses or a subnet in CIDR net/bits format, or a SenderBase ID. Individual reports can specify ranges of minutes, hours or days. In some implementations, all reports are for a single injector and a single MTA. However, off-box post processing tools can create reports that aggregate per-injector measurements for a single host or measurements for multiples hosts.

Data can be collected in any suitable time interval. For example, data can be collected for one-minute intervals and per-minute data sets are aggregated to 10-minute data sets and written to disk. As a result, no more than 10 minutes of measurement data can be lost as a result of a reboot.

B. Intervals and Time Boundaries

Monitoring email messages can provide each customer that has an MTA with reports that match that customer's time zone and reporting requirements. Daily reports typically fall on day boundaries and monthly reports fall on month boundaries. For weekly reports, the customer generally wants to be able to specify the day the week ends and have the weekly report start and end on a day boundary.

All work is done in "local time" with the epoch adjusted from GMT to timezone. For example, a customer on the west coast can operate the system in Pacific Daylight Time (PDT), and therefore days start at 00:00 PDT and end at 23:59.59 PDT.

Totals for one-minute intervals are recorded to disk in "minute directories" with names that include the number of LocalMinutes since the epoch. These minute directories are put in hour directories and the hour directories put in day directories. The naming convention is:

IDB.Day.[LocalDays]/IDB.Hour.[LocalHours]/IDB.Minutes.[LocalMinutes]

For example:

IDB.Day.12264/IDB.Hour.294343/IDB.Minutes.17660580 is used to store data for the first minute of the first hour of July 31, yyyy (local time).

All numbers refer to the beginning of the time period. In the above example IDB.Day.12264 is used to store data for the day beginning July 31, yyyy (local time);

IDB.Hour.294343 the hour on that day beginning at 00:00 (local time),

IDB.Minutes.17660580 refers to the minute beginning 00:00 (local time).

A time range is specified as:

min<=t<max

The following are definitions relating to time intervals:

| Name | Definition |
|---|---|
| LocalSeconds | Seconds since the epoch adjusted by the difference between localtime and GMT. |
| LocalDays | Days since the epoch with day boundaries matching the current time zone. Note that not all days have 86400 seconds, and therefore converting from days to seconds by multiplying by 86400 seconds is not always correct since the epoch adjusted by the difference between localtime and GMT. |
| LocalHours | Hours since the epoch. With rare exceptions (e.g. the hour of change to or from daylight savings time), LocalHours can be converted to LocalSeconds by multiplying 3600. |
| LocalMinutes | Minutes since the epoch. With rare exceptions, LocalMinutes can be converted to LocalSeconds by multiplying 60. |

For Daylight Savings time, in the spring, no values are recorded or reported for the hour that is lost when the clock is advanced. For example, if local time "springs forward" from 01:00 to 02:00, no traffic is reported for the hourly report corresponding to that hour. The daily report includes only 23 hours of data. In the fall, the clock is "slowed-down" during the "fall-back" hour so that each minute contains two minutes worth of data. The hourly report for the fallback hour contains a total corresponding 120 "real" minutes, and therefore, the daily report for that day contains 25 hours of data.

Suppose that a user wants all the data for the month of July. To specify a time range, the user needs the first second in July and the first second in August. For explanation purposes, denote these limits as "startTime" and "endTime," respectively. The following is an example:

```
current_time = list(time.localtime(time.time( )))
current_time[5] = 0
current_time = tuple(current_time)
```

-continued

```
in_time = time.strptime ('07/01 00:00', '%m/%d %H:%M')
the_time = current_time[0:1] + in_time[1:5] + current_time[5:]
startTime = time.mktime(the_time)
in_time = time.strptime ('08/01 00:00', '%m/%d %H:%M')
the_time = current_time[0:1] + in_time[1:5] + current_time[5:]
endTime = time.mktime(the_time)
```

The first day directory is computed by mailrpt.getLocalDay as follows:

```
>>> startTime
1057042800.0
>>> ctime(startTime)
'Tue Jul 1 00:00:00 yyyy'
>>> mailrpt.getLocalDay(startTime)
12234
```

The day after the last day directory is as follows:

```
>>> endTime
1059721200.0
>>> ctime(endTime)
'Fri Aug 1 00:00:00 yyyy'
>>> mailrpt.getLocalDay(endTime)
12265
```

The range of days is:

12234 <= d < 12265

The report is created by totaling the counters the databases in IDB.Day.12234 through IDB.Day.12264.

The above description of what directories are used is not needed to retrieve the data for July. All that is needed is startTime and endTime. A "mailrpt" API can be used that works as follows:

```
baseIDBdir = '/var/log/godspeed'
rspec = mailrpt.reportSpec('day', baseIDBdir)
rspec.startSeconds = startTime
rspec.endSeconds = endTime
iDict = mailrpt.fetchIPintervals(rspec)
```

C. Aggregating Reporting Intervals

Aggregation of on-disk directories is done by a background thread. The thread aggregates Interval Dictionaries to Minute Dictionaries that contain counters corresponding to a 60-second period of time. Minute Dictionaries are aggregated to Hour Dictionaries and Hour Dictionaries are aggregated to Day Dictionaries. After aggregation, the thread sorts by network address and by each type of counter. The cost of doing these sorts in the background is low. Having pre-sorted data allows for the reporting commands to provide the desired interactive response time.

D. Managing Counters

In some implementations, counters are initially recorded by time-interval and network address. At message-processing time, counters are kept in a "Current Dictionary," which can be implemented as a small dictionary that corresponds to a short interval of time (e.g., 10 seconds). A background thread aggregates counters into larger dictionaries with more network addresses and counters that correspond to longer time intervals. As a result of performing aggregation in the background instead of during normal message processing, message latency is low and large sets of counters can be efficiently processed in a batch mode.

Message information can be recorded on time interval boundaries. For example, date for minute reports are recorded on minute boundaries and data for hour reports are recorded on hour-boundaries. If the report interval is specified in minutes, at most 60 seconds worth of counters are missing from the report as a result of the time of the report not falling on a minute boundary. If the report interval is specified in hours, at most 60 minutes of counters are missing from report as a result of the time of the report not falling on an hour boundary.

In addition, so-called "Mixed-unit intervals" (hours plus last N minutes) can be used. As an alternative, mixed unit intervals can be omitted, and a user that needs a report for the last hour and a half can request a 90-minute interval.

The server can count recipients in any of a number of ways, including but not limited to, the following:
1. Count the number of RCPT TO commands received.
2. Count the number of RCPT TO commands to which the server replies "250 recipient . . . ok".
3. Count the number of RCPT TO commands associated with messages that are enqueued for delivery.

The server can count messages in any of a number of ways, including but not limited to, the following:
1. Count the number of DATA commands received.
2. Count the number of DATA commands to which the server replied "354 go ahead".
3. Count the number of DATA commands to which the server enqueues the message and replies "250 ok".

E. Recording Counters

How counters are recorded can depend on what is being counted. For example, some counters relate to events at the start of a session, such as messages and recipients and may be referred to as inbound counters, while other counters and relate to events during a session, such as application of a policy. In recording counters for some implementations, an IP tuple can be used. An IP Tuple is a tuple containing remote IP address, local IP address, remote port, and local port.

The subset of the IP Tuple used to index inbound counters consists of the IP of the connecting host (Remote IP) and the IP of the injector (Local IP). As a debug and test option, the Local Port can be set in the tuple, but by default it is set to zero. The remote port is ignored and the value of Remote Port is set to zero in the IP Tuple. The entire IP Tuple is used as a key in the host object dictionary and the entire tuple is stored on disk. In addition, the local and remote port can be used.

At the start of a session, a "session.run" method is invoked. If access is set to TCPREFUSE (e.g., to refuse the connection from the sender), a connection counter called the HostCounter.connectionFailures counter is incremented and the connection is closed. Otherwise, a session object is created and SMTP processing starts. The HAT may also used to limit the number of recipients. The index of the matching HAT rule is recorded. Senders matching the default HAT rule ("ALL") are considered "unclassified senders".

During the SMTP session, counters for messages, recipients and bytes are incremented and stored in the host object. Counters for messages and recipients are incremented and stored in the session object by code that controls per-session limits.

When a Current Interval expires, a new Current dictionary, corresponding a new Current Interval is created. The interval is checked each time a new connection is accepted or a DATA command is processed. If necessary, a new host object is created. Processing of other commands such as RCPT TO or STARTTLS does not cause a new host object to be created.

At the time an interval expires, some updates to the current dictionary may be pending. However, when the inbound message handling threads complete these pending updates (usually within a second of the expiration event), the old dictionary becomes a read-only Interval Dictionary.

After a minute boundary has passed, the 10 second interval dictionaries that are more than one-minute old are "rolled up" to one-minute dictionaries and these dictionaries are written to disk. As a result, the Current Interval is at least 50 seconds ahead of the most recent interval dictionary included in the rollup. This means that for a host object to be written to disk prior to completion of all updates to that object, at least 50 seconds will elapse since the last connection or data command from that host. In some implementations, testing the age of a counter object prior to every update can be performed. However, in general, the 50-second buffer approach is often a suitable optimization of performance and update integrity, although the data on disk will not include the most recent 60 seconds of traffic.

Per-minute dictionaries are written do disk on an event driven basis. The creation of a new interval dictionary, causes a test to see if enough time has passed to write per-minute dictionaries do disk. In a typical implementation, fewer than 13 10-second interval dictionaries are stored in memory. If there is a steady flow of mail, a per minute dictionary, representing traffic for the 60 seconds prior to the minute boundary that was passed about 60 seconds ago, is written about once per minute.

F. Command Line Interface

The user interface for accessing the monitoring system can include a command line interface (CLI) that can be incorporated into the CLI for the MTA. For example, the CLI for monitoring email messages can include an enhanced topin command and new select and report commands, as described below. A configuration command can control the resources devoted to counters.

The topin command reports on counters for the last 5 minutes. The default is to sort by recipients (in descending order) and display the top ten records. Other sort fields that can be specified are messages, bytes received, or connections.

The following is a sample of the topin command:

```
topin
Injector: Public_SMTP (port 25)
Status as of:          Fri Mar 21 10:59:21 yyyy
# Remote hostname     IP address   connections  messages  recipients
bytes
```

An optional number of records and field(s) to sort by can be specified. For example:

```
topin 20 messages bytes
``` sorts first by messages and then by bytes.

The select command controls what records are used to generate a report by specifying the time interval and key selection criteria. With the select command, the user can limit the records used to the topin or report commands to domain names within a domain, a range of IP addresses or a subnet in CIDR net/bits format. For example:

```
select domain=edu
``` limits topin and report to domains containing "edu."

The interval option can be used to change the length of the time in minutes that the report and topin commands use. For example, to set the time interval to last ten minutes.

```
select interval=10
```

The start and stop options set the start time and stop time for a reporting interval. The selection rule is: start<=time<stop. Times are in the timezone configured by the user. The format is:

```
'%m %d %H:%M %Y'
``` where '% m' is the number of the month, '% d' is the day of the month, '% H' is the hour in the range of 0 to 23, '% M' is the minute and '%Y' is the 4-digit year. These commands, for example, cause the topin and report command to use data from 16:30 to 17:00 on March 3, yyyy:

```
select start='3 20 16:30 yyyy'
select stop='3 20 17:00 yyyy'
```

The other formats accepted are:

```
'%m %d %H:%M'
'%H:%M'
``` where the missing values for year month and day are derived from the local time on the system.

The report command is used to select the fields to display. The names of fields are define in the "mailFlowHost Object". For example, the command "report ip recipients messages" causes IP address, recipients and messages to be displayed.

The number of records displayed can be limited by using the "limit" option. For example, "report limit=50" causes at most 50 records to be displayed. The command "report limit=all" causes all records matching the select criteria to be displayed. The default limit is 25.

The "sort" option specifies the field to sort by (in descending order). For example,

```
report sort=messages domain messages recipients
    bytes
``` displays domain, messages recipients, and bytes, sorted by messages.

G. Data Structures and Related Definitions

This section defines data structures and technical terms that are used with a system that includes the use of counters for monitoring email messages at a server, such as an MTA.

A database is used to record counters by network address, such as by remote IP address. Auxiliary information relating to the remote IP address, including but not limited to the fully qualified domain name (FQDN) and the SenderBaseID, are also recorded. For each remote IP address observed in the current recording interval, an inbound host Counter is allocated, such as for tracking the number of recipients, messages, and bytes received from the remote IP address, and the resulting message information is recorded in a mailFlowHost object. For example, the mailFlowHost object can be configured so that there is a one-to-one correspondence between fields in the mailFlowHost object and the fields in the database record. Such a class provides a good model for memory-efficient storage of counters per IP address or per domain name. The HostCounter object described in the next section is implemented in a similar way.

The mailFlowHost object can include one or more of the following fields:

```
remoteIP - the IP address of Remote host
localIP - the IP address of the MTA
remotePort - the Port address of Remote host
localPort - the Port address of the MTA
remote_hostname - if not None, cached hostname
recipientsIn
recipientRejectsIn
RATrecipientRejectsIn
tooManyrecipientRejectsIn
messagesIn
bytesIn
connectionAcceptsIn
connectionFailuresIn
connectionRejectsIn
starttlsSuccessesIn
starttlsFailuresIn
recipientsOut
recipientRejectsOut
messagesOut
bytesOut
connectionAcceptsOut
connectionFailuresOut
connectionRejectsOut
starttlsSuccessesOut
starttlsFailuresOut
SenderBaseOrgID
SenderBaseReputationScore
HATruleIndex
interval
spamScanMsgsIn
spamFoundMsgsIn
virusFoundMsgsIn
bounces
doubleBounces
recipientsUnknownIn
```

A Recording Interval is a period or time during which a set of InjectorHost objects (or InjectorDomain objects) containing measurements for an IP address (or domain name) is created.

An IP Tuple is a tuple containing remote IP address, local IP address, remote port, and local port.

An Interval Dictionary stores the measurement data collected during a recording interval. Each Interval Dictionary entry contains an IP Tuple as a key and a HostCounter as a value.

The Domain Mapping Database records the view of the mapping between IP addresses and fully qualified domain names.

The Current Interval is the current Recording Interval.

The Current Dictionary is the Interval Dictionary for the Current Interval.

The Current Domain Dictionary is the Interval Domain Dictionary for the Current Interval.

IPv4 addresses are typically used. Typically, an IP address is kept in host byte order to simplify sorting and aggregation.

For each RCPT TO command, a recipient counter is incremented. If processing a DATA command is successful, the message counter is incremented by one. In a typical scenario, each time the message counter goes up by one the recipient counter goes up by one or more, but it is possible for either of these counters to increase while the other remains constant.

The following table illustrates one approach for a server to count the processing of SMTP commands. Note that, for clarity, the MAIL FROM commands required by the protocol are not included in the table. In this example, total recipients are incremented once for each RCPT TO command and total messages are incremented once for each DATA command.

| Event | Total Recipients | Total Messages |
|---|---|---|
| RCPT TO | 1 | 0 |
| RCPT TO | 2 | 0 |
| RCPT TO | 3 | 0 |
| DATA | 3 | 0 |
| (FAIL) | 3 | 0 |
| RCPT TO | 4 | 0 |
| RCPT TO | 5 | 0 |
| RCPT TO | 6 | 0 |
| DATA | 6 | 0 |
| (OK) | 6 | 1 |
| RCPT TO | 7 | 1 |
| DATA | 7 | 1 |
| (OK) | 7 | 2 |
| RCPT TO | 8 | 2 |
| DATA | 8 | 2 |
| (OK) | 8 | 3 |
| DATA | 8 | 3 |
| (OK) | 8 | 4 |

Each host object has 32-bit HATruleIndex field containing two 16-bit numbers is recorded. The first number (high 16 bits) is the sender group ID and the second number (low 16 bits) is the policy ID. The directory of mappings is kept in a configuration data file.

The sender group ID of one is reserved for the "ALL" group. The "ALL" group applies to senders that did not match any other group. These may also be referred to as "Unclassified Senders". The sender group ID of zero is reserved for a sender group that does not have a name. This is also treated as an "Unclassified Sender". The sender group ID is returned by HATSenderGroup::get_name_id( ).

The external representation of the sender's reputation score is an ASCII string ranging from "−10.0" to "10.0". A positive number implies a "good" reputation, i.e. a legitimate sender of email messages that people want to receive. A negative number implies a "bad" reputation, a spammer. A reputation score of "0.0" implies that the sender's reputation is neutral. This external representation is supported by the internal representation as shown in the following example:

```
                    SenderBaseReputationScore
        3                   2                   1                   0
    0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |          flags                  |V|         reputationScore    |
    +-+-+-+-+-+-+-+-+-+-+-+-+-+-+-+-+-+-+-+-+-+-+-+-+-+-+-+-+-+-+-+-+
```

The internal representation of the reputation score ("reputationScore") is a "signed short", which is a 15-bit number ranging from −32000 to +32000 (decimal), and a sign bit. The internal representation of the reputation score is stored in a 32-bit field that includes the signed short in the low-order 16-bits while flags are stored in the high 16 bits. The lowest order flag bit, validReputationScore or 'V' in the diagram above, indicates that the reputationScore is valid.

The external format reputation scores are converted to internal representation by the following steps:

Convert to float, then multiply by 3200, and convert to integer.

Store as a signed short in reputationScore.

Set the valid bit ('V').

In some implementations, the conversion is int(320*float (sbrs)), where 'sbrs' is the SenderBase reputation score. For example, the internal representation of "10.0" would be 32000 (decimal). The internal representation of 9.12 would be 29184.

The internal format reputation scores are converted to external representation by the following steps:

Test the valid bit ('V').

Extract the integer from signed short in reputationScore.

Divide integer by 3200.

Convert the string with one digit after decimal point ("%.1f" % x).

For example, the internal value 31040 would be converted to "9.7".

At the time a mailFlowHost is created, the 32-bit SenderBaseReputationScore field is initialized to zero. Because the validReputationScore bit, 'V', is not set, this is not considered a valid score and is reported as "NA". When a reputationScore is recorded, the 'V' bit is set.

The number of RCPT TO commands from remote hosts that match the HAT rule: "ALL", which is also called, "Unclassified Recipients".

In some implementations, the HAT group 1 is reserved for "ALL", while in other implementations, zero may be used. Prior to writing a per-minute network address file, the value of the HATruleIndex is tested to determine it the remote host is unclassified. If it is, the number of recipientsIn is added to the number of recipientsUnknownIn.

The following code fragment shows how the HATruleIndex and I_recipientsIn are used to compute I_recipientsUnknownIn:

```
HATgroup = (ip_dict[k].I_HATruleIndex >> 16) & 0x0FFFFL
if HATgroup == 0 or HATgroupMaybe == 1:
    newdict[k].I_recipientsUnknownIn += ip_dict[k].I_recipientsIn
```

Recipient based injection control is done on an hourly limit by IP address, network, SenderBase Organization or domain name. In some implementations, there is also a limit on the number of recipients per message. The tooManyrecipientRejectsIn counter is incremented when a recipient is rejected because one of these limits has been exceeded.

H. On-Disk Database and Report Generation

An "on-disk database" can be used to store message information collected by the monitoring system. For example, the on-disk database can consist of a data file and a set of index files with a network address for the key, or the on-disk database can consist of a data file and index file with the domain name as the key.

The on-disk database efficiently uses disk space, while allowing for generation of reports in a reasonable period of time (e.g., no more than two seconds to display the top ten for any field). The data file consists of keys and fields that are sorted by key, and the index files are simple key and single field that are sorted by field. This format easily allows for a top-ten report, and a binary search will provide suitable performance for other types of reports.

A small amount of overhead may be added to these formats in order to facilitate the use of a free, no-objectionable-license database tool, and a conversion tool can translate from this dense storage format to a standard database format.

The on-disk IP database has an IP Tuple in host byte order as its key set. Within the key set, the primary key is the IP address of the remote host (remoteIP, in host byte order). The data file has the following record format:

| Position | Name | Length | Description |
| --- | --- | --- | --- |
| Key[0] | remoteIP | 32 bits | Remote IP Address |
| Key[1] | localIP | 32 bits | Local IP Address |
| Key[2] | remotePort | 16 bits | Remote Port |
| Key[3] | localPort | 16 bits | Local Port |
| Field[0] | recipientsIn | 32 bits | Number of RCPT TO commands accepted |
| Field[1] | recipientRejectsIn | 32 bits | Number of RCPT TO commands rejected |
| Field[2] | RATrecipientRejectsIn | 32 bits | Number of RCPT TO commands rejected by RAT |
| Field[3] | tooManyrecipientRejectsIn | 32 bits | Number of RCPT TO commands rejected by recipient limit (from HAT or SenderBase limit) |
| Field[4] | messagesIn | 32 bits | Number of messages enqueued for delivery |
| Field[5] | bytesIn | 64 bits | Total bytes received, excluding SMTP protocol messages |
| Field[6] | connectionAcceptsIn | 32 bits | Number of successful inbound connections |
| Field[7] | connectionFailuresIn | 32 bits | Failures during inbound connection setup |
| Field[8] | connectionRejectsIn | 32 bits | Number of inbound connections rejected |
| Field[9] | starttlsSuccessesIn | 32 bits | STARTTLS commands successfully processed |
| Field[10] | starttlsFailuresIn | 32 bits | TLS failures after STARTTLS command received |
| Field[11] | recipientsOut | 32 bits | RCPT TO commands that succeeded |
| Field[12] | recipientRejectsOut | 32 bits | RCPT TO commands that were rejected |
| Field[13] | messagesOut | 32 bits | Message sent and server responded "OK" |
| Field[14] | bytesOut | 64 bits | Total bytes sent, excluding SMTP protocol messages |
| Field[15] | connectionSuccessesOut | 32 bits | Outbound connections established and accepted |
| Field[16] | connectionFailuresOut | 32 bits | Outbound connection setup failures (in TCP) |
| Field[17] | connectionRejectsOut | 32 bits | Outbound connections established then rejected |
| Field[18] | starttlsAcceptsOut | 32 bits | STARTTLS commands that established a secure connection |
| Field[19] | starttlsFailuresOut | 32 bits | STARTTLS commands that failed |
| Field[20] | SenderBaseOrgID | 32 bits | Sender Base Organization ID |
| Field[21] | SenderBaseReputationScore | 32 bits | flags + signed short. See Section "2.4.13 SenderBaseReputationScore" |
| Field[22] | HATruleIndex | 32 bits | Number used to report on hat group and policy |
| Field[23] | spamScanMsgsIn | 32 bits | Messages scanned by anti-spam software |
| Field[24] | spamFoundMsgsIn | 32 bits | Messages classified as SPAM |

-continued

| Position | Name | Length | Description |
|---|---|---|---|
| Field[25] | virusFoundMsgsIn | 32 bits | Messages classified as containing a virus |
| Field[26] | bounces | 32 bits | Messages from sender that we bounced |
| Field[27] | doubleBounces | 32 bits | (possibly) double bounces discarded |
| Field[28] | recipientsUnknownIn | 32 bits | Total for group "ALL", computed from HATruleIndex at rollup |

The IP tuple (remoteIP, LocalIP, remotePort, localPort) is the key. In addition to the 96-bit key, this record containes 27 32-bit values and two 64-bit values. Thus, each data record consumes 6+(27*4)+(2*8), a total of 136 bytes. This record length is recorded in the README file that describes the database as follows:

remoteIP (32 bits) messagesIn (32 bits)

Twenty-six of the index files contain 8 bytes per IP address. Two of the index files (bytesin and bytesOut) contain 12 bytes per IP address. For each IP address, a records in the index files consume 232 bytes, and the data record consumes 136 bytes. This is a total of 368 bytes per key.

The Domain Mapping Database is an alternate way to view the IP database. "Reverse DNS" mappings of IP address are stored by domain name. The key to the Domain Database is the fully qualified domain name (FQDN). Fields include IP address, FirstObserved, (a timestamp that indicates when the mapping was first observed), LastObserved (a timestamp that indicates when the mapping was most recently observed), UseCount (number of times this mapping was used), MatchingAQueries (the number of times the "forward" or "A" mapping was observed), and SenderBaseID. Note the mapping between IP address and domain name does not always follow a simple, regular pattern.

In some implementations, report generation will occur in these stages:
1. Extract IP addresses from Domain Database.
2. Sort IP addresses.
3. Extract IP database records for each interval selected.
4. Aggregate records.

By this method, a report domain report can be generated with one pass over the IP database for each interval within the time frame selected. A similar method is used to report by SenderBaseID.

The following table shows the domain names an IP addresses for some of Cisco's mail exchangers:

| Domain Name | IP Address |
|---|---|
| proxy0.cisco.com. | 128.107.241.178 |
| proxy5.cisco.com. | 64.103.36.137 |
| proxy6.cisco.com. | 203.41.198.245 |
| proxy9.cisco.com. | 192.135.250.71 |

To generate a report for cisco.com for the time period 9:00<=t<10:00, the following steps will be followed:
1. Extract the IP addresses 128.107.241.178, 64.103.36.137, 203.41.198.245 and 192.135.250.71 from Domain Database.
2. Sort IP addresses in ascending order (e.g., 64.103.36.137, 128.107.241.178, 192.135.250.71, 203.41.198.245)
3. Extract records for these four IP addresses from the 9:00 Hourly IP database.
4. Aggregate counters from these records.
5. Report a total for cisco.com.

A Domain Mapping Database is used to convert Domain Names to IP address and to convert SenderBaseIDs to IP addresses. For example, the data file can have the following fields:

| Position | Description | Length |
|---|---|---|
| DomainName Length | length of FQDN in bytes, including null | 32 bits |
| Key | DomainName | variable (Key Length BYTES) |
| Field[0] | IP address | 32 bits |
| Field[1] | firstObserved | 32 bits |
| Field[2] | lastObserved | 32 bits |
| Field[4] | ptrQueries | 32 bits |
| Field[5] | MatchingAQueries | 32 bits |
| Field[6] | NonMatchingAQueries | 32 bits |
| Field[7] | SenderBaseID | 32 bits |

The DomainName is a null-terminated string that represents the fully qualified domain name returned by the PTR lookup. The Domain data file is sorted by Domain Name; the IP index file is sorted by IP address. There are two copies of this file, one sorted by Domain, the other sorted by SenderBaseID. The sort by domain is done as follows:
1. Split the domain name into the strings delimited by periods.
2. Domains are sorted in lexical order of the string furthest to the right.
3. Subsorts are done by the next string from the right until all strings are exhausted The following is an example list of sorted domains:
mail.atheros.com
ns1.atlanticasp.com
one.atomicservers.com
two.atomicservers.com
ns59.attbi.com
ns60.attbi.com
ns61.attbi.com
ns62.attbi.com
pixie.artic.edu
ns1.azwestern.edu The right-hand most strings are "corn" and "edu", so the "corn" strings come before the "edu" strings. Among the dot coms, the next strings from the right are "atheros", "atlanticasp", "atomicservers" and "attbi". The first three characters of these strings differ: "ath", comes before "atl", which comes before "ato", which comes before "att". Within "attbi.com", "ns59" comes before "ns60", and so on. Even though the letter "p" comes after the letter "n", "pixie.artic.edu" comes before "ns1.azwestem.edu" because "artic" comes before "azwestem".

The files that form a database (index files and the data files) are stored together within a subdirectory that also contains a description (README) file that describes the database. This README file is written last, and the presence of the README file indicates that the database is complete. The name of the directory identifies the time interval covered by the database by specifying its units and end time in units since the epoch.

For example, the directory "IDB.Hour.291815" contains the hourly rollup that is 291815 hours since the epoch. This directory also contains up to 60 subdirectories that are minute rollups. For example the subdirectory "IDB.Minutes.17508848" contains the rollup for the minute that is 17508848 minutes since the epoch.

The location of this directory can be set with a configuration variable. In some implementations, the directory will appear to the ftp user as 'MFM' and therefore, after connecting via FTP, the user will be able to enter "cd MFM" and access the database hierarchy.

Counters are incremented and written for each per minute database. A separate process, rptd, aggregates the databases to hours days and weeks and months. The rptd process is also responsible for deleting old databases and removing databases when necessary to stay below a disk limit. If a disk limit is exceeded the oldest database is removed first.

The rptd process does hourly aggregation of the previous hour one minute after the hour. The rptd process uses the README file as confirmation that each one-minute database is complete. If the README file is not present, the directory is not used. If any of the expected 60 directories are missing, or if any one-minute directory does not contain a README file, rptd writes a log message.

Daily databases can be rolled up to weekly databases, or monthly databases, or both. The maximum number of daily weekly and monthly databases is configurable. If weekly databases are made, the limit on the number of daily databases may specified to not be less than eight. If monthly roll-ups are done, the limit on the number of daily databases can be specified to be not be less than 32.

The limit on total disk used by mail Flow Monitor databases is configurable. The default limit is 40 GB. Log messages will warn the user each time the amount of space available decreases by a specified amount, such as by 1 GB.

The domain index into the IP database depends on the number of mappings between IP addresses and FQDNs and the average FQDN length. The domain index is typically less than 500,000 mappings, with each mapping consuming 100 bytes (e.g., less than 50 MB total). This amount is storage is significantly smaller as compared to the set of IP databases.

The per-record usage the IP database is 332. A 500,000 record Weekly Database requires 166 million bytes of disk space. A 200,000 record Daily Database requires 66.4 million bytes of disk space. A 20,000 record Hourly Database requires 6.6 million bytes. A 2,000 record Minute Database required 0.7 million bytes. The table below shows some alternative disk allocations:

| Total Gigabytes | Minute Databases | GB per Minute Database | GB for Minute Databases | Hourlies | GB per Hourly | GB for Hourlies | Dailies | GB per Daily | GB for Dailies | Weeklies | GB per Weekly | GB for Weeklies |
|---|---|---|---|---|---|---|---|---|---|---|---|---|
| 18.753 | 120 | 0.0007 | 0.084 | 72 | 0.0066 | 0.475 | 14 | 0.0664 | 0.930 | 104 | 0.166 | 17.264 |
| 2.684 | 120 | 0.0007 | 0.084 | 72 | 0.0066 | 0.475 | 32 | 0.0664 | 2.125 | 0 | 0.166 | 0 |

Given that the long-term (i.e., weekly or monthly) rollups tends to have a large number of records, long-term rollups need not be kept on local disk. For example, 32 dailies can be kept, but no monthly or weekly rollups. Each week (or month), the customer could generate reports from the dailies and store the reports off-box.

Reports are generated by specifying the following:
1. Level of resolution (e.g., by week, by day, by hour, or by minute).
2. Time period (e.g. last three hours).
3. Sort criteria (e.g. top recipients).
4. Number of records to display.

Many organizations review traffic on a weekly basis. The following are examples of daily-resolution reports that can be generated for the past week, and thus these reports are examples of those that can be included in quick report feature 320 and quick report feature 440:

Top 50 IPs, sorted by recipientRejects

Top 20 domains, sorted by recipientRejects

Top 30 IPs, matching the ALL HAT rule, sorted by recipientsin (top unclassified IPs by recipientsin)

Top 10 second-level domains, data derived from IP addresses matching the ALL HAT rule, sorted by recipientsIn past weekFind senders that are not classified Top 15 senderbase organizations, data derived from IP address matching the ALL HAT rule, sorted by tooManyrecipientRejects The reporting system will compute percent change in recipients attempted per the following formulas:

$$recipientsAttempted = recipientsAccepted + recipientsRejected$$

$$avergaRecipientsAttempted30Day = sum30Day(recipientsAttempted)/30$$

$$percentChangeRecipientsAttempted = (thisDayRecipientsAttempted/avergeRecipientsAttempted30Day - 1)*100$$

If the system has been collecting data for less than 30 days (e.g. a new install), then the average can be computed over the number of days for which data have been collected.

I. Host Access Table (HAT) and Recipient Access Table (RAT)

In some implementations, a host access table (HAT) maintains a set of rules that control incoming connections and treatment of messages received from remote hosts. Each injector (e.g., each sender of email messages to the MTA) can be associated with a separate HAT. Typically, there are five basic access rules included in the HAT, as follows:

(1) ACCEPT—the connection is accepted, with injection limited by the recipient access table (RAT).

(2) RELAY—the connection is accepted, and injection to any recipient is allowed (the RAT is bypassed).

(3) REJECT—the connection is refused, with the sender getting a 4xx or 5xx SMTP message, but no messages are accepted (e.g., a polite refusal).

(4) TCPREFUSE—the connection is accepted but immediately dropped, so that the sender receives nothing in return (e.g., refused at the TCP level; a not so polite refusal).

(5) CONTINUE—the mapping is ignored, and processing of the HAT continues, and if the connection matches a later entry that is not "CONTINUE," that later matching entry is used instead.

In addition to the five basic access rules, one or more of the following parameters can be specified for by host. In some implementations, the following parameters are allowed for the "ACCEPT" and "RELAY" access rules, but not the remaining basic access rules.

(1) max_concurrency—specifies the maximum number of connections allowed from the host.

(2) max_message_size—specifies the maximum message size from the host.

(3) max_msgs_per_session—specifies the maximum number of messages that may be injected per session (typically counts successfully injected messages).

(4) max_rcpts_per_msg—specifies the maximum number of recipients allowed per message.

(5) smtp_banner_text—specifies the SMTP banner displayed when a host first connects.

(6) smtp_banner_code—specifies the SMTP codes used in the SMTP banner.

(7) tls—specifies whether or not TLS (transport layer security) is to be used or required (allowed values include "on", "off", and "require").

(8) max_rcpts_per_hour—specifies the maximum number of recipients that will be accepted for the given host, per hour (e.g., for injection control).

(9) max_rcpts_per_hour_code—specifies the SMTP response code to be given to a host who has exceed the maximum recipient per hour limit; can use a default of 452 per RFC2821.

(10) max_rcpts_per_hour_text—specifies the SMTP response message to be given a host who has exceed the maximum recipient per hour limit.

(11) use_sb—specifies whether to query SenderBase for information and whether to use the SenderBase information to craft the name of the counter to be incremented (allowed values include "on" and "off")

(12) netmask—specifies the size of the mask to apply to the IP address to craft the name of the counter to increment; allowed values are numbers between 0 and 32;a value of 0 means that a single counter will result for all IP addresses that matched this or a similarly masked HAT entry.

In some implementations, a row in the HAT consists of four parts: (1) an entry name, referred to as a "label", (2) a host specification, referred to as "hosts", (3) an access rule, referred to as "access", and (4) a parameter list, referred to as "params". These four items can be defined as follows:

(1) "label"—a label is a name given to a HAT entry and in some implementations, obeys the same naming convention as for filters in that the label starts with a letter or underscore, but after the initial character, the label can include letters, numbers, underscores, or hyphens.

(2) "hosts"—a host specification, and can include more than one listed host; see the host syntax examples below.

(3) "access"—is the selected basic access rule (e.g., "ACCEPT", "RELAY", "REJECT", "TCPREFUSE", or "CONTINUE").

(4) "params"—a list of parameter name/value pairs.

In some implementations, the hosts are listed in order from top to bottom, and the first non-CONTINUE rule to match is used.

Examples of host specifications are given below. Multiple addresses can be used, as well as being grouped together.

n.n.n.n—IP address.

n.n.n.|n.n.n|n.n.|n.n|n.|n—partial IP addresses.

n.n.n.n-n—n.n.n-n.|n.n-n.|n-n.—range of IP addresses.

fqdn—fully qualified domain name.

.partialhost—everything with the partialhost domain.

n/c|n.n/c|n.n.n/c|n.n.n.n/c—CIDR address blocks.

sbo:<something>—SenderBase organization ID.

sbrs[n1:n2]—SenderBase reputation score ("x" matches if n1<=x<n2).

ALL—special keyword that matches ALL addresses (used as a catch-all for when no previous rule matches).

On the right hand side of the HAT, actions can be listed, such as the basic access rules, or a variable can be used, as denoted by a leading $ as part of the variable name. Once a variable is specified, the variable can be used on the right hand side, with the values assigned to the variable being substituted automatically, which can provide a convenient form of shorthand notation.

The following is an example HAT:

```
# This is an example HAT table. Comments like these will be lost during
# the import process.
# Here we define three variables, "$BLACKLIST", "$WHITELIST", and "$GREYLIST"
# Variable definition lines may not have labels.
$BLACKLIST      REJECT  {   smtp_banner_text="You have been blacklisted."
}
$WHITELIST      ACCEPT  {   max_concurrency = 600,
                            max_message_size = 20M,
                            smtp_banner_code = 220,
                            smtp_banner_text = "Hello there." }
$GREYLIST       ACCEPT  {   max_message_size = 5M,
                            max_rcpts_per_hour = 5k,
                            max_rcpts_per_hour_text =
"You have exceeded 5,000 recipients this hour.
If you feel this limit is too low, please contact mailadmin@mycompany.com",
                            use_sb = Y,
                            netmask = 24
                        }
# This next line is an example of a simple entry. It uses "IronPort_SB"
# as the label, uses an SenderBase ID as the host, uses the $WHITELIST
# predefined behavior as the action, and has the line comment of
# "IronPort Organization". This comment can be saved in the system and
# will always be mapped to this entry.
```

```
IronPort_SB:    sbo:4988397762         $WHITELIST  (IronPort Organization)
# This next example is indicative of what might have been merged in from an
# older HAT table. It has no label and does not refer to any predefined
# behavior.
10.1.1.2                RELAY
# This is an entry with no hosts.
EmptyList:              $GREYLIST
# This example shows how one can assign a behavior to multiple hosts at once.
# Note the comments applied to each host in the group in parenthesis. These
# comments will be mapped to those hosts and saved internally. The comments
# on the end of the line, using # signs, are also legal, but need not be
# saved during the import process.
Personal_IPs:
10.1.1.7 (Joe's Computer),              # Joe's computer
10.1.2.255/24 (Tom's Computer)          # Tom's computer
            ACCEPT  { max_message_size=20M }
# This example shows separation with only whitespace (no commas)
Cut_and_Pasted_from_SenderBase:
1.2.3.4
1.2.3.5
1.2.3.7
1.2.3.8
            $BLACKLIST
# A blacklist is for people from whom messages are not desired.
# Uses a predefined behavior.
Blacklisted: 10.1.1.3 (SpamCo), 10.1.1.18 (Spamatron) $BLACKLIST
# This example shows the use of a SenderBase Reputation score...
Looks_Like_Spam:
    sbrs[-10:-7.5]   (Catch low reputations)
            $BLACKLIST
# The "ALL" entry must always appear last, and defines the behavior for any
# incoming connection that doesn't match the previous rules.
ALL                     $GREYLIST (Rate limit everyone else.)
```

For new injectors, default HATs can be established. For example, a new public injector can use "ALL ACCEPT" while a new private injector can use "ALL RELAY."

The following is a list of parameters that can be used in the HAT. For each parameter, the list includes the parameter name (which can include letters, digits, and underscores) followed by an "=" sign, and then the value. The value can be a number or a string, and numbers can be followed by the letter "M" which multiplies the number by 1,048,576. Numbers followed by the letter k are multiplied by 1,024. A simple string value is just a sequence of alphanumeric characters (with no spaces). If a more complex string is needed, then it can be enclosed with double quotes. Backslash is the escape character used in a quoted string. Parameters can be continued on the next line as long as there is some whitespace at the beginning of the line. Quoted strings do not need the whitespace, but if it exists, then it will be removed. This syntax is defined in ABNF form as specified in RFC2234.

```
VCHAR           = %x21-7E                       ; visible (printing) characters
ALPHA           = %x41-5A | %x61-7A             ; A-Z / a-z
SP              = %x20
HTAB            = %x09                          ; horizontal tab
DIGIT           = %x30-39                       ; 0-9
ALNUM           = ALPHA | DIGIT
float           = [- | +]? DIGIT+ ["." DIGIT+]?
space           = SP | HTAB
line_break      = CR | LF | CRLF | comment
WSP             = space | line_break
allowed_policy  = 'ACCEPT' | 'RELAY' | 'CONTINUE'
denied_policy   = 'REJECT' | 'TCPREFUSE'
policy          = allowed_policy | denied_policy
line_label      = [A-Za-z_]+[A-Za-z0-9_-]*
behavior_label  = $[A-Za-z_]+[A-Za-z0-9_-]*
range           = DIGIT{1,3} "-" DIGIT{1,3}     ; values from 0 to 255
Snum            = DIGIT{1,3}                    ; representing a decimal integer
                                                ; value in the range 0 through 255
ip-addr         = Snum ["." Snum]{3}
ip-block        = Snum ["." Snum]{0,3} ["."]?
ip-range        = [Snum "."]{0,3} range
netsize         = DIGIT{1,2}                    ; value in range 0 through 32
ip-cidr         = Snum ["." Snum]{0,3} "/" netsize
sub-domain      = ALNUM [ALNUM | "-" | "_"]* ALNUM
glob-hostname   = ["." sub-domain]+
fqdn            = sub-domain ["." sub-domain]+  ; Note: This is a loose
                                                ; specification of a fqdn.
```

-continued

```
senderbase_id      = "sbo:" DIGIT+           ; SenderBase IDs are integers
senderbase_rep     = "sbrs[" space* float space* : space* float space* "]"
host               = ip-addr | ip-block | ip-range |
                     ip-cidr | fqdn | glob-hostname | senderbase_id
host_block         = [host paren_comment? [[',' | WSP] WSP* host
paren_comment?]*]? |
                     'ALL'
definition         = policy [space+ param_block]? WSP* paren_comment? line_break
policy_definition  = policy [space+ param_block]? WSP* line_break
rightside          = definition | label WSP* paren_comment? line_break
label_definition   = behavior_label WSP+ policy_definition
host_line          = [line_label:]? host_block WSP+ rightside
unit               = 'k' | 'M' | 'G'
number             = [0-9]+ unit?
quote              = %0x27
dquote             = %0x22
qchar              = %x01-21 | %x23-%x26 | %x28-%x5b | %x5d-%xff
                     ; Any characters except \, ", and '
string             = Any number of printable characters except quotes, which
                       must be escaped if they match the quotes used to delimit
                       the string. (How to best represent this?)
comment            = WSP* '#' string line_break
paren_comment      = WSP* '(' [%x01-%x28|%x29-%x5b|%x5d-%xff|\\|\)]* ')'
                     ; Any characters except \ and ), but allow \\ and
                     ; \) as escape patterns for those characters
squote_string      = quote [qchar | dquote | line_break | escape quote]* quote
dquote_string      = dquote [qchar | quote | line_break | escape dquote]* dquote
quoted_string      = squote_string | dquote_string
option             = 'on' | 'off' | 'require'
numerical_param    = 'max_concurrency' | 'max_message_size' |
                     'max_msgs_per_session' | 'max_rcpts_per_msg' |
                     'smtp_banner_code' | 'rate_limit' |
                     'max_rcpts_per_hour' | 'max_rcpts_per_hour_code' |
                     'netmask'
string_param       = 'smtp_banner_text' | 'max_rcpts_per_hour_text' |
                     'tls' | 'use_sb'
param              = numerical_param space* '=' space* number |
                     string_param space* '=' space* quoted_string
params             = param [[',' | WSP] WSP+ param]*
param_block        = '{' WSP* params WSP* '}'
table              = entry*
entry              = comment | label_definition | host_line
```

A HAT can be imported into the system, and comments made with the # sign are stripped out. The file can be internally represented with two data structures, one containing the list of behavior definitions, and the other containing the list of the mappings between hosts and behaviors.

Behavior definitions can be stored as a dictionary that is keyed off the names of the definitions. The value of each key is a tuple of a behavior code and a dictionary of parameters. The five behavior codes are "CONTINUE", "ACCEPT", "RELAY", "REJECT", and "TCPREFUSE". Any entry with a behavior that is not "CONTINUE" is one that may be matched during IP address processing.

The following is an example of a set of behavior definitions, following by a representation of the data structure.

```
$BLACKLIST    REJECT  {   smtp_banner_text="You have
                          been blacklisted."
}
$WHITELIST    ACCEPT  {   max_concurrency = 600,
                          max_message_size = 20M,
                          smtp_banner_code = 220,
                          smtp_banner_text = "Hello there." }
$GREYLIST     ACCEPT  {   max_message_size = 5M,
                          max_rcpts_per_hour = 5k,
                          max_rcpts_per_hour_text =
"You have exceeded 5,000 recipients this hour.
If you feel this limit is too low, please contact
mailadmin@mycompany.com"
}
```

-continued

```
behaviors =    {'BLACKLIST':
                  ('REJECT', {'smtp_banner_text':'You have been
                   blacklisted.'}),
               'WHITELIST':
                  ('ACCEPT', {'max_concurrency':600,
                     'max_message_size':12582912,
                     'smtp_banner_code':220,
                     'smtp_banner_text':'Hello there.' }),
               'GREYLIST':
                  ('ACCEPT', {'max_message_size':5242880,
                     'max_rcpts_per_hour':5120,
                     'max_rcpts_per_hour_text':'You have
exceeded 5,000 recipients this hour.\nIf you feel this limit is too low,
please contact mailadmin@mycompany.com'}),
               }
```

The mapping of hosts to behaviors can be implemented as an ordered list. Each element of the list is a tuple containing: (1) the label (or None if there is no label), (2) a list of lists of hosts (each nested list is an aggregate), (3) the behavior (either a string, if referring to a behavior definition, or a behavior tuple, as above, if the definition is "inline"), and (4) an entry comment (or None, if there is not comment associated with the entry).

Each host is represented itself as a tuple of three values: the type (e.g., IP address, hostname, or SenderBase organization ID), the host itself (e.g., an IP address, CIDR block, domain name, etc.), and a comment (or None, if there is no associated comment).

The following shows an example set of HAT mappings, followed by the representation of the data structure.

```
Personal_IPs:
  10.1.1.7 (Joe's Computer),        # Joe's computer
  10.1.2.255/24 (Tom's Computer)    # Tom's computer
              ACCEPT { max_message_size=20M }
Blacklisted:  .spamco.com (SpamCo), sbo:1234 (Spamatron)
$BLACKLIST (Spammers)
HAT_mappings = [("Personal_IPs",
                 [("10.1.1.7", "Joe's Computer"),
                  ("10.1.2.255/24", "Tom's Computer")],
                 "ACCEPT",
                 {"max_message_size":20971520},
                 None),
                ("Blacklisted",
                 [(".spamco.com", "SpamCo"),
                  ("sbo:1234", "Spamatron")],
                 "$BLACKLIST",
                 "Spammers"),
                ]
```

In some implementations, a recipient access table (RAT) specifies which recipients will be accepted. The RAT specifies the recipient address, which may be a partial address or hostname, and whether to accept the recipient address or to reject the recipient address. In some implementations, the RAT can be used to denote recipient addresses that are not subject to injection control by the HAT.

For example, for some commonly used addresses, such as "postmaster" at a particular domain, the user does not want the system to limit messages addressed to such common addresses. As a specific example, if the system restricts message injection from an IP address, the user typically would want that sender to be able to send a message to the "postmaster" email address to inquire as to why the sender's messages are being limited. This can be particularly useful in situations in which an IP address is being limited by the system inadvertently, such an IP address associated with a partner company, as opposed to an IP address associated with a spammer. If such senders could not have a way in which to get a message through to the mail administrator of the recipient host, the user may have a difficult time learning that an IP address is being limited that should not be since the messages from the sender inquiring as to the limited message flow would itself be blocked by the injection control portion of the system.

Optionally, the SMTP response to the "RCPT TO" command can be included for the recipient. Each injector has its own RAT. The hosts are listed in order from top to bottom, and in some implementations, the first rule to match is used.

Examples of the addresses that can be used in the RAT include the following. Multiple addresses can be specified.
  user@domain—a complete email address.
  fqdn—a fully qualified domain name.
  .partialhost—everything with the partialhost domain.
  user@—anything with the given username.
  ALL—special keyword that matches ALL addresses, typically used as a catch-all when no other addresses are matched.

Typically, there are two access rules included in the RAT, as follows:
  (1) ACCEPT—the connection is accepted, with injection limited by the recipient access table (RAT).
  (2) REJECT—the connection is refused, the sender gets a 4xx or 5xx SMTP message, but no messages are accepted.

The following is an example RAT.

```
yahoo.com      ACCEPT
example.com    REJECT    smtp_response_code=554
                         smtp_banner_text="Go away."
postmaster@    ACCEPT    smtp_response_code=250
                         smtp_response_text="Postmaster mail
                         accepted."
ALL            REJECT
```

For new injectors, default RATs can be established. For example, a new public injector can use "ALL REJECT" while a new private injector can use "ALL ACCEPT."

Generally, the format of the RAT is the same as for the HAT except for the address and access fields.

J. Managing Information Relating to Senders of Electronic Messages

(1) Overview

This section describes approaches and techniques for collecting, aggregating, and managing information relating to the senders of electronic messages. In one aspect, the techniques include obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and providing the message volume information related to the one or more message senders.

In another aspect, the approaches include receiving one or more messages from a particular message sender, sending a request for message volume information related to the particular message sender, receiving the message volume information related to the particular message sender, where the message volume information related to the particular message sender was determined by obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and limiting delivery of messages from the particular message sender based on the message volume information related to the particular message sender.

In another aspect, the approaches include receiving one or more messages from a particular message sender, sending a request for message volume information related to the particular message sender, receiving the message volume information related to the particular message sender, where the message volume information related to the particular message sender was determined by obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and blocking delivery of a particular message from the particular message sender based on the message volume information related to the particular message sender.

(2) Example Information About an Email Sender

Example information that a data processing unit may collect for message senders are: time of the first request for information about that email sender, volume over time of requests for information about that email sender, percentage of total volume of all requests for information about that email sender, network owner of the IP address from which the message is sent, network topology information for the area of the network in which the IP address of the email sender is located, category of enterprise or organization to which the email sender belongs, time that the IP address of the sender last changed ownership, geographical location of the email sender, geographical information about the path the email message has taken, or any other appropriate information.

The time of the first request for information about a particular email sender may be obtained by keeping information related to each request for information for each sender about which information is requested. Whenever information is requested for a sender, a record or set of records related to the request for information may be recorded or modified. For example, if no information for that sender has been recorded previously, then a new record or set of records is created and the time of the first request is recorded.

A data processing unit collects the volume over time of requests for information about an email sender or group of senders. The calculation of volume over time may be performed in any appropriate manner and for any appropriate time periods. For example, the volume over time may be calculated as the number of requests for information about a particular sender or group of senders over a day, week, month, 30-day period, or year. As another example, the volume over time is calculated as a percentage as follows:

> Percent volume over time T=(number of information requests for a particular sender or group of senders for time T)/(total number of information requests for all senders for time T)

Alternatively, the volume over time may be calculated as an estimate of total number of messages a particular sender or group of senders has sent on the entire Internet as follows:

> Estimated Total Number of Messages over Time T=Estimated Total Number of Messages on Internet over time T* Percent volume over time T Alternatively, the volume over time may be calculated logarithmically to provide a magnitude value as follows:

> Magnitude value for time T=10+$\log_{10}$ (Percent volume over time T)

Another example of a volume over time calculation is the fluctuation in volume over time. For example, one or more of the following can be used: determine the fluctuation in volume over time as a percentage or absolute change in any appropriate volume calculation over time T1 as compared to time T2, where T1<T2;determine a percentage or absolute change in any appropriate volume calculation over time T1 as compared to time T2, where T1 and T2 do not overlap; determine a percentage or absolute change in any appropriate volume calculation over time T1 as compared to time T2, where T1<T2 and T2 represents the entire time range for which information about a sender or group of senders has been collected; or any other appropriate calculation.

A data processing unit determines the network owner associated with a message sender based on the IP address from which the message is sent. Also, a network owner can be determined by geographical location, domain name, or any other appropriate identifier associated with the sender. In other implementations, a network owner is determined by querying a list or data structure of known network owners of IP addresses, or a determination of network owner may be based on domain name, geographical location, or any appropriate information.

Network owners are typically broken up into one or more groups, herein called network operators. For example, an Internet Service Provider (ISP) may be listed as the network owner for a large block of IP addresses. In such an example, the network operators of portions of the IP addresses owned by the network owner (the ISP) may be used by an email gateway or other server or application to indicate blocking a message, bouncing a message, throttling messages from a sender or group of senders, or displaying the information based on the network owner or network operator.

The network operators of IP addresses within a set of IP addresses owned by a single network owner are estimated by assigning separate blocks of IP addresses :to separate operators, receiving information from the network owner indicating which IP addresses are operated by which network operators, or estimating network operators based on domain names associated with the IP addresses. For example, an ISP is a network owner and owns a block of IP addresses at "152.2.*.*". In such an example, the block of IP addresses may be broken up into blocks of 256 IP addresses: "152.2.1.*", "152.2.2.*", . . . , "152.2.256.*"

The decision whether to break up a network owner may be based on the number of IP addresses owned by the network owner or by the category of the ISP. For example, if an ISP owns 1024 IP addresses, it may be useful to divide the 1024 IP addresses into four sets of 256 IP addresses and assign a network operator to each. In such an example, any blocking, throttling, or other action taken based on the network operator will not effect all of the potential message senders with IP addresses owned by the ISP, but will effect only a portion of the senders. As another example, an email-marketing firm that owns 1024 IP addresses may not have its 1024 IP addresses divided into multiple network operators. In such an example, any and all messages may be considered to come from the same company and should be, if appropriate, blocked, throttled, or any appropriate action taken.: Assigning a network operator to a set of IP addresses comprises assigning a new network owner corresponding to the network operator for the set of IP addresses.

The data processing unit obtains network topology information for the area of the network in which the IP address of the email sender is located. In some implementations, network topology information that is associated with a particular sender includes network owners of IP addresses near the IP address of the particular sender, network owners of other IP addresses associated with the same geographical area, or any appropriate network topology information. For example, a particular sender has a particular IP address. If that IP address is near one or more other IP addresses that are suspected spam senders, then the IP address may be rated as more likely to produce spam. As a specific example, an IP address is near another if the two IP addresses have the same high-order significant bits, where the number of bits that are high-order significant bits may be any number of bits, including from 1 bit to 31 bits.

The data processing unit obtains the category of the enterprise or organization associated with the email sender. For example, the categories associated with email message senders can be airlines, Fortune 500 companies, Fortune 1000 companies, Fortune 1500 companies, ISPs, banks, or any appropriate category.

The data processing unit records the change of ownership of an IP address. In some implementations, the change of ownership is recorded by clearing previous information about the IP address or indicating that the owner of the IP address is unknown. Information that may be cleared about the IP address or other indicator may include the first recorded request about a message, volume of requests, or any other appropriate information. In one embodiment, the information request handler keeps track of the number of times that an IP address changes owners. The information about change of ownership combined with other information, such as message volume information, may be used to indicate that a sender may be sending spam.

The data processing unit records geographical location of the email sender. For example, the geographical location of the email sender is determined by the IP address, domain name, or a look up table indicating the geographical location of the email sender. Geographical information may be useful in determining which messages are valid. As another example, if a particular email recipient never receives email from China, then a message from China may be more likely to be spam.

The data processing unit obtains geographical information about the path the email message has traveled, or the geographical path, based on the header information in the email message. The header information in the email message may indicate a path the email message has taken since it was sent. Geographical information may be determined based on the header information in any appropriate manner, including determined by the IP address, domain name, or other look up table indicating the geographical location of gateways the email message has traversed.

The techniques described herein are in no way limited to using the types of information that are described herein. Any appropriate type of information related to the email sender, email messages, or email recipient may be used. For example, information related to email messages may include information in the content of the message, such as the existence of keywords or tokens. An example of email recipient information may be the amount of spam a particular email recipient receives. For example, if 90% of the email that a particular email recipient receives is spam, then that information may be used to aid in the estimation of whether an email directed to that recipient is spam.

(3) Example Process for Managing Information Related to Electronic Messages

The following is an example of a process for collecting, processing, and making available information related to electronic messages.

First, data related to information about email senders is obtained. Various types of data that may be obtained from the following: an email gateway, an information request handler, an email client, or any other appropriate source. As a specific example, data is obtained by requesting the information from the information source. Alternatively, the information source may provide the information based on any appropriate event or based on any appropriate schedule instead of being provided in response to a request. The data may also be obtained by performing a DNS zone transfer. Additionally, multiple sets of data for one or more email senders may be obtained from multiple sources or from the same source at two or more different times.

Next, the data related to information about email senders is processed. For example, multiple sets of data related to email senders obtained from multiple sources or obtained from the same source at different times may be taken in aggregate and processed. As another example, processing the data includes determining one or more of the following: a volume of messages over time, the percentage of message sent by a message sender compared to all messages sent, a magnitude value, a change of absolute or percentage of total messages of a particular time period as compared to a different time period, a change of absolute or percentage of total messages during a particular time period as compared to absolute or percentage of total messages since the first request for information about the sender was received, or any other appropriate calculation. As another example, a data processing unit calculates a magnitude value for a particular network owner associated with a particular message sender and determines the change in the magnitude value as compared to the magnitude value for the previous day.

In some implementations, processing information related to a message sender includes storing information related to the message sender in a database, flat file, or other storage mechanism. For example, processing information related to a message sender includes determining the network owner or network operator associated with the message sender. As another example, the IP address, domain name, geographical location, or network topology of the message sender is used to determine the network owner or network operator associated with the message sender. The decision whether to associate a network owner or network operator with a message sender is based on whether the IP address or domain name of the message sender is in a set of IP addresses or domain names associated with the network owner or network operator.

The determination of which network operator to associate with a message sender is made by dividing the set of IP addresses for a network owner associated with a message sender into two or more network operators and determining which network operator to associate with a message sender based on which network operator is associated with a set of IP addresses containing the IP address of the message sender. A network owner is divided into network operators based on the category of the network owner, based on the number of IP addresses associated with the network owner, based on information about one or more network operators within the network operator, or any other appropriate decision. For example, a message sender is associated with an IP address, which is associated with a particular network owner. The particular network owner is an ISP that owns 1024 IP addresses. The network owner is split into four network operators, each corresponding to 256 IP addresses. The message sender's IP address fall into the range associated with a particular network operator, and the message sender is associated with the particular network operator.

Processing the data related to information about email senders includes determining or storing category information for network owners and network operators. Determining the category information for network owners or network operators may include receiving the category information through a GUI, via an electronic interface, or from an email gateway, information request handler, email client, or any appropriate source. Alternatively, the category information may be determined automatically using an automatic categorizer based on keyword detection, Naive Bayes, or any other appropriate categorization mechanism. Determining the category information includes accessing a list containing category information and cross-referencing it to message senders, network owners, or network operators. The category information includes a list of airlines, Fortune 500 companies, Fortune 1000 companies, Fortune 1500 companies, ISP's, or any other appropriate category.

Processing the data related to information about email senders includes determining information related to the history of an IP address associated with the message sender. The information about the history of the of the IP address includes determining when a first request for information was made about the message sender, how many requests have been made about the sender, how many requests over time have been made about the sender, how often the IP address has changed network owners, when the IP address last changed ownership, and any other appropriate information. For example, a data processing unit processes data related to an IP address' history in order to determine and store when a request for information about the email sender was first made.

Processing the data related to information about email senders includes determining geographical information. An external electronic service is queried to determine the geographical location of a message sender. The geographical location of a message sender is determined by looking up the location of the IP address associated with the message sender in a lookup table or by querying an electronic service, and then the geographical path of a message is determined. The geographical locations of hubs, routers, or gateways through which the email traveled are determined. The information about hubs, routers, or gateways through which the email traveled is determined by parsing the message header. For example, a data processing unit parses the header of a message from a message sender in order to determine the geographical location of all hubs, routers, and gateways through which the email has traveled.

Next, information related to email senders is made available. The information is made available via a graphical user interface or an electronic interface, and the information is made available by responding to requests for information about message senders, by sending it to an interested party based on particular rules, or by making the data available in a public or private website.

The graphical user interface, by which the information related to email senders is made available, can be from a web site, a graphical interface to a computer program, or any other appropriate graphical interface. Single items or multiple data items as described herein are presented in the graphical user interface.

The information related to email senders may also be made available via an electronic interface. For example, the electronic interface is a DNS-like interface. Alternatively, any appropriate electronic interface may be used, including a web service, a rsync gateway, a FTP server, a HTTP server, a HTTPS server, a defined remote procedure call interface, a TCP/IP sockets interface, a UDP interface, or any other appropriate interface.

K. Determining a Reputation Score for a Sender

In some implementations, a reputation of a message sender is determined by obtaining two or more lists from two or more list providers, then determining which lists of the two or more lists indicate the message sender, and then determining a reputation score for the message sender based on which lists of the two or more lists indicate the message sender.

In addition, an indication can be provided that a message is unsolicited based on a reputation score. Also, information from the two or more lists can be stored in an aggregate list data structure, and determining what lists indicate the message sender includes querying the aggregate list data structure. In a related feature, a particular list is one of the two or more lists and the particular list contains one or more entries, and storing information from the two or more lists in the aggregate list data structure includes determining the difference of the particular list with a previous version of the particular list, storing entries of the particular list that were not in the previous version of the particular list in the aggregate list data structure, and removing from the aggregate list data structure entries that are not in the particular list but were in the previous version of the particular list.

In yet another related feature, determining the reputation score includes determining an individual score for each list of the two or more lists and determining an output score based on the individual score for each list in the two or more lists. Also, determining the output score includes determining an aggregate score based on the individual score for each list of the two or more lists, determining a normalized score based on the aggregate score, and determining the output score based on the normalized score.

In some implementations, the individual score for each list in the two or more lists each includes an individual probability and a list of probabilities includes the individual probability for each list in the two or more lists, and determining the aggregate score based on the individual score for each list of the two or more lists includes performing a Chi Squared calculation on the list of probabilities. In related features, the approach includes one or more of the following: receiving a request for the reputation of the message sender; receiving the request for the reputation of the message sender by receiving a request formatted as a DNS request; the message sender is associated with a particular IP address; determining what lists of the two or more lists indicate the message sender includes determining for a particular list of the two or more lists whether the particular IP address of the message sender is contained in an IP address range indicated by the particular list; and if a particular list indicates an IP address range, setting a bit corresponding to the particular list in a particular list bit mask data structure corresponding to the IP address range.

In some implementations, setting the bit corresponding to the particular list is performed for each list of the two or more lists, and the sender corresponds to a particular IP address, the particular IP address is contained within a first IP address range that has associated with it a first list bit mask, and the IP address is contained within a second IP address range associated with a second list bit mask. In addition, determining which lists of the two or more lists indicate the message sender can be accomplished by performing an "or" operation on the first list bit mask and second list bit mask to produce a third list bit mask and determining what bits are set in the third list bit mask.

Some implementations can include receiving a message from a message sender, obtaining a reputation score of the message sender, where the reputation score of the message sender was determined by obtaining two or more lists from two or more list providers, determining which lists of the two or more lists indicate the message sender, determining the reputation score for the message sender based on which lists of the two or more lists indicate the message sender, and if the reputation score is worse than a first predefined threshold, indicating that the message is unsolicited.

Related features include one or more of the following: if the reputation score is better than a second predefined threshold, an indication is made that the message is valid, where the first predefined threshold is different from the second predefined threshold; if the reputation score is better than the first predefined threshold and worse than the second predefined threshold, indicating that the message is not estimated as either valid or invalid; sending a request for the reputation score of the message sender; obtaining the reputation score of the message sender by receiving a response to the request for the reputation score of the message sender; and sending the request for the reputation score of the message sender includes sending a particular request formatted as a DNS request.

The following example for determining a reputation score is described assuming that the sender is associated with an IP address. The techniques described herein, however, are in no way limited to use of IP address as an identifier of a sender. In other embodiments, the sender is identified by domain name, email address, geographical location, or any appropriate mechanism.

First, a score is obtained corresponding to each list. For example, this score is obtained by determining, for each blacklist, whether the sender's IP address is in the particular list. If the IP address is indicated in the particular list, then the score for the list represents a certain percentage likelihood that the message is an unsolicited electronic message (often higher than 50%). If the IP address is not indicated in the particular list, then the score for the list still represents a certain percentage likelihood that the message is an unsolicited message (often less than 50%).

In another example, this score is obtained by determining, for each "white" list, whether the sender's IP address is in the particular list. A white list is a list of IP addresses and ranges that are believed to be associated with senders of legitimate electronic messages. If the IP address is indicated in the particular list, then the score for the list represents a certain percentage likelihood that the message is unsolicited (often less than 50%). If the IP address is not indicated in the particular list, then the score for the list represents a certain percentage likelihood that the message is unsolicited (often higher than 50%).

In other examples, a white list or blacklist will contain ranges of IP addresses and exceptions to those IP addresses, thereby including all IP addresses in a range except those that are excluded. The white lists and blacklists contain integer or floating point values indicating scores for IP address ranges and IP addresses, and these scores are used to determine an aggregate score for an IP address with respect to the lists. Also, an aggregate list data structure is queried to determine which lists indicate the sender.

Next, an aggregate score is generated based on the scores for each list determined above. For example, the score for each list is a percentage likelihood that a message is unsolicited and the aggregate score is an aggregate percentage likelihood that is generated based on the individual percentages likelihoods. As another example, this aggregate percentage likelihood is based on a weighted average of the individual percentages likelihoods, a sum or product of the individual percentages likelihoods, a polynomial of the individual percentages likelihoods, or any appropriate calculation. As yet another example, the aggregate percentage is based in part on the Chi Squared function over the probabilities, a Robinson calculation, a Bayes calculation, or any other appropriate mechanism. As a specific example, the Chi Squared function is depicted in the Python Programming Language (www.python.org) code.

Next, the aggregate score is mapped to a normalized score. For example, the aggregate score is an aggregate percentage, and the normalized score is a mapped percentage that has the range from 0% to 100%, and this step is performed by mapping the aggregate percentage to the normalized range from 0% to 100%. As another example, this mapping is linear, piecewise linear, cubic, polynomial, or uses any other appropriate function. As a specific example, a piecewise linear method of mapping the aggregate function is used and comprises determining the known lowest possible probability (LP), the known average probability (AP), the known highest possible probability (HP), and linearly mapping percentages from LP to AP to 0% to 50% and percentages from AP to HP to 50% to 100%. In equation form, with aggregate probability represented as P, this can be represented as follows:

$$\text{Mapped Percentage (MP)} = \begin{cases} \text{if } (P < AP); (P - LP) * 50 / (AP - LP) \\ \text{else; } (P - AP) * 50 / (HP - AP) + 50. \end{cases}$$

For example, if LP is 30%, AP is 40% and HP is 80%, then percentages from 30% to 40% would map to 0% to 50% and percentages from 40% to 80% would map to 50% to 100%. In such an example, 35% would map to 25% and 60% would map to 75%.

In related examples, LP is determined by performing the calculations of the previous step using the lowest possible score (e.g. percentage) for each of the lists, and HP is determined by performing the calculations of the previous step using the highest possible score (e.g. percentage) for each of the lists, and AP is determined by performing the calculations of the previous step using a random sample of possible values and averaging the result.

Next, the normalized score is mapped to an output score. In one embodiment, a mapped percentage is mapped to an output (mapped) score. In various embodiments, this mapping is linear, piecewise liner, cubic, piecewise cubic, polynomial, or piecewise polynomial, exponential, piecewise exponential, or any appropriate mapping. In one embodiment, this mapping is performed by using a piecewise function such as:

$$\text{Mapped Score (MS)} = \begin{cases} \text{if } MP < .5; (-\log (MP)/ \log (2) - 1) / lo\_k \\ \text{else }; 1.0/hi\_k * (1 - 1/\log(2) * \\ (\log (1/(1-MP)), \end{cases}$$

where lo_k and hi_k are constants. It may be beneficial to use hi_k and lo_k values approximately in the range of 0.5 and 2.0. It may be beneficial to use hi_k and lo_k values approximately in the range of 0.6 and 1.0. Hi_k and lo_k may each have the same value or may have different values.

These examples of determining a reputation score for an electronic message sender are based on which lists indicate the IP address of the sender. A result of this example is the determination of a composite score for the sender of the email messages.

L. Controlling Mail Injection

The most basic approach to controlling the injection of mail to a system from a sender is to either allow all messages from the sender or to reject all messages from the sender. Such an "all or nothing" approach is simple and easy to implement, but it may not be appropriate in all situations, and thus, it is desirable to have the ability to define a "grey" area between allowing everything and allowing nothing such that some messages will always be allowed, but at a certain point, messages will be rejected or limited. Allowing some but not all messages may be referred to as injection control because the rate at which senders can send or "inject" email messages to an MTA is limited or controlled. Other equivalent terminology includes "throttling" the flow of messages because some but not all messages are allowed in a given time, and thus the overall rate at which email messages are being accepted by the MTA from the sender is being limited or throttled to a specified rate.

The ability to throttle mail injection, or to control the rate at which one or more senders can send messages to a recipient domain, can be useful for a number of reasons. For example, a high injection rate can be indicative of spam, which is generally undesirable. As a specific example, if a company with a mail gateway device that normally receives a few hundred email messages per hour suddenly begins to receive over a thousand message each hour from a particular IP domain, it is likely that the email messages are part of a spam campaign from the IP domain.

As another example, a large influx of otherwise desired messages over a short period of time can cause problems for the recipient domain, including crashing the recipient domains mail servers. As a specific example, if a large company works with an outside contractor to send press releases, copies of which are to be sent to all the employees of the large company, the mail servers at the large company could experience stability problems due to the large number of messages being sent in a short period of time. Since the large company wishes to have each employee receive the press release, but the large company also wants to avoid stability problems with its mail servers, the ability to control and limit the rate that the messages containing the press release are received can be beneficial.

The threshold point at which a sender, or a remote injector, of email messages is to be controlled depends on the particular implementation and can be configured by the user of the system, such as the administrator of an MTA, although a default value can also be used even if the user has not specified a value. For example, a sender injecting 200 messages/hour may be indicative of a spammer at a small company having only 50 employees, but for a large company with 10,000 employees, such an injection rate may be perfectly normal for mail from non-spam sources.

Once the threshold limit is reached on the rate that a sender is injecting messages, one of a number of approaches can be taken to limit the rate at which subsequent messages are injected. For example, the injection of the messages can be artificially slowed over each connection. However, a spammer can circumvent this approach by opening more connections, although as described herein, the number of connections can also be limited. As another example, the recipients can be rejected by the recipient domain, such as be sending a 452 SMTP error code that indicates that the sender has injected too many recipients. This allows the system to continue to count recipients, which can be done after the message is accepted but prior to forwarding the message to the recipient. As additional examples, TCP_REFUSE or accept_then_close can be used instead of sending a 4xx SMTP error code (e.g., a polite refusal, in contrast to the less polite TCP_REFUSE or accept_then_close approaches).

Mail injection can be controlled based on one or more rules, such as one or more entries in the HAT. As data is accumulated via the counters, that measured data is compared to the parameters in the HAT to determine if any actions are to be taken. It is possible that more than one action will apply to a particular situation. For example, a HAT entry may exist specifically for IP address 1.2.3.4, plus another entry for the CIDR block of 1.2.3/24, both of which would apply to a connection from IP address 1.2.3.4. As a result, the system determines which of the two entries to apply. In some implementations, the HAT is order specific such that the first entry in the HAT that matches to the connection is used. Thus, if the entry for CIDR block 1.2.3/24 is listed before the entry for IP address 1.2.3.4, the action for the entry for CIDR block 1.2.3/24 is used. In other implementations, each entry in the HAT includes a priority identifier, and the entry with the highest priority identifier is used.

Any of a number of attributes can be matched in the HAT, including but not limited to, one or more of the following: a network address, an IP address, an IP address range, a CIDR block, an exact FQDN match, a partial FQDN match, and a SenderBase organization ID. As a catch-all or default entry, a default value, such as "ALL," can be used for controlling the injection rate when no other HAT entry matches, and thus the "ALL" entry can catch senders that are otherwise unclassified (e.g., not matched by any other HAT entries).

For limiting injection and providing injection control, the HAT can include a parameter that specifies the maximum number of recipients in a particular time period, such as the maximum number of recipients per hour (e.g., max_rcpts_per_hour). For example, once the specified limit is reached, the system does not accept any more recipients for the remainder of the time period (e.g., until the end of the hour for an hour-based counter). The HAT can also include a parameter (e.g., max_rcpts_per_hour_text) for the user to specify a custom SMTP response message to be used if a recipient is rejected due to such a rate limitation, as well as the SMTP code that should be returned (e.g., max_rcpts_per_hour_code for which the default can be set to SMTP code 452). The system can be configured to use a default text response if the user does not specify a custom response. For example, the default text response can be "Too many recipients injected this hour" for an hourly based injection rate counter/limitation.

In the situation in which the catch-all HAT entry "ALL" is used, and it is that entry that is matched on the counter that exceeds the specified limit, additional handling can be performed if the system is configured to work with SenderBase. For example, if SenderBase has supplied a Flow Control Coefficient, the rate limit specified for the "ALL" entry in the HAT can be multiplied by the coefficient prior to comparison to the counter. Thus, the coefficient is a positive floating point number that is greater than zero and can typically is less than or equal to one. However, it is possible that the coefficient could be greater than one, depending on the output from SenderBase and approach used to determine the coefficient.

Typically, the counter used for controlling mail injection is the rate at which recipients are accepted by the recipient host domain. A recipient is considered to be "accepted" if the recipient is not rejected due to rate limiting of the mail flow. As a result, if the recipient is rejected due to improper email address format or because the system is not supporting relaying, the counter is not incremented. However, in other implementations, the counter is incremented regardless of the reason for the recipient being rejected.

M. Controlling the Number of Connections to a Recipient Domain

Techniques are described for controlling the number of connections to a recipient domain or recipient host. For example, the system establishes a counter for the number of connections to a recipient host, such as an MTA, and when the number of connections exceeds a specified number, no further connections are allowed until the number: of current connections drops below the specified number. As a specific example, a mail server may have a limit of 50 connections at any given time, so that when the 51st connection is attempted, the mail server refuses to establish the connection with the sending host.

In some implementations, the number of allowed connections is counted based on one or more sender identifiers. For example, the number of connections from an IP address can be limited to a specified number, and the number of connections from another IP address can be limited to another specified number. In general, any type of sender identifier can be used, including but not limited to, one or more of the following: a network address, an IP address, a range of IP addresses, a list of IP addresses, a domain, a fully qualified domain name, a SenderBase organization ID, and a reputation score, such as a SenderBase reputation score.

In one embodiment, the maximum number of connections is specified by a parameter in the HAT. For example, a variable called "max_concurrency" is used to specify the number of connections for the associated sender identifier. In general, any type or combination of sender identifiers can be used on the left side of the HAT so that the system aggregates connections from all of the corresponding sender IP addresses and compares the aggregate number of connections to the specified maximum number of connections, and when the limit is exceeded, each connection is treated with the REJECT action.

In addition, in some implementations, one or more sender identifiers can be excluded from the counter that is compared to the maximum number of allowable connections. For example, the user can add an entry to the RAT to specify one or more IP addresses or other sender identifiers that are not to be counted against the maximum number of connections for the sender identifier that is specified in the HAT.

N. Limiting Directory Harvest Attacks

In one embodiment, the system tracks the number of invalid recipient addresses, and when a specified number of invalid recipient addresses have been received, the system no longer sends a bounce message to the sender. For example, a spammer can use a directory harvest attack to generate a list of valid email addresses for a host domain. Because the recipient host typically generates a bounce message when a message is addressed to an invalid email address, the spammer can determine valid email addresses based on the lack of a bounce message, thereby constructing a directory of valid email addresses at the recipient host. While directory harvest attacks can be prevented by never sending bounce messages, there will be messages that include invalid addresses, due to typographical errors in entering the address for example, for which a bounce message should be desired. The approach described herein allows a limited number of bounce messages, but at a certain point, bounce messages are no longer returned to the sender of the emails having invalid email addresses, based on the assumption that when the specified limit is reached, the likely cause of so many invalid recipient addresses is that a directory harvest attack is occurring.

For example, the HAT can include a rule that associates a sender identifier with a variable, such as max_invalid_rcpts_per_hour, that specifies the maximum allowed number of invalid email recipient addresses in a given time period, such as one hour. A counter is used to track the number of invalid email addresses from the sender. So long as the counter does not exceed the specified limit, invalid addresses are treated in the typical fashion, with an SMTP response being sent back to inform the sender that the email address is invalid (e.g., a bounce message). However, when the counter exceeds the specified maximum number of invalid email addresses during the time period, bounce messages are no longer sent to the sender and the messages are dropped. At the end of the time period, the counter is reset to zero and begins tracking the number of invalid recipients from the sender once again.

As a result, when a directory harvest attack occurs, some of the initial messages sent by the sender are treated in the normal fashion with bounce messages generated and sent for any invalid addresses. The spammer can determine based on the initial messages some valid and invalid email addresses. However, after the limit is reached and the invalid recipient address messages begin to simply be dropped, the spammer no longer receives any bounce messages, and thus the spammer is incorrectly led to believe that all the messages are addressed to valid email addresses, when in fact many or perhaps even most are not. When the spammer uses the subsequently created list of allegedly valid email addresses, most will then bounce at a later time during a spam mailing campaign, or will be treated again as a subsequent directory harvest attack.

The specified limit on the number of invalid recipient addresses can be set by the user, such as the administrator for the MTA, and the MTA can be configured with a default value and whether to have directory harvest attack prevention enabled or not. A limit of zero can be used to disable the limit. As an example, a typical recommended value for the maximum number of invalid recipients can be 10 invalid recipients per hour per sender identifier (e.g., HAT entry).

Sender identifiers for directory harvest prevention work in the same manner as for mail flow injection control and limiting the number of connections. Thus, the sender is keyed off of the string value in the HAT host entry that matches the incoming connection, or the constructed string value if the use SenderBase (e.g., "use_sb") option is active.

In some implementations, the analysis of whether recipient addresses is performed outside of the SMTP conversation. Thus, whether the recipient address is invalid is determined after the SMTP conversation. Any bounce messages generated for invalid recipient addresses must be sorted by the spammer to determine why the attempted delivery failed, which servers to further deter the directory harvest attack.

For purposes of designating the start of a directory harvest attack, some implementations may use the time at which the first invalid recipient email address that exceeds the specified limit occurs. The detection of a directory harvest attack can be logged and reported to SenderBase, if desired. The identification of a directory harvest attack can include additional information, such as the IP address of the sender from which the invalidly addressed messages originate, the reversed DNS results for the sender's IP address, the HAT entry that matched the sender, and the threshold limit for the number of invalid recipients.

Optionally, an alert message can be sent to the user or administrator of the recipient host, and the mail flow monitoring system can track the number of recipients being rejected after the start of a directory harvest attack. For the alert sent to the user, one or more of the following items of information can be included: notification of a potential directory harvest attack, the fact that a message has been dropped (instead of bounced), the IP address of the sender of the dropped message, the reversed DNS results of the sender's IP address, the HAT entry that matched the sender, the threshold/limit set for the number of invalid recipients per period of time, the Envelope Sender from the message envelope, the Envelope Recipient(s) from the message envelope, and the Message Headers.

The following is a CLI example for establishing the parameters for directory harvest attack prevention.

---

Enter the maximum number of recipients per message. Type DEFAULT to inherit the
    value from the default settings.
    [1000]>
    Would you like to specify a custom SMTP response? [N]>
    Do you want to enable rate limiting per host? (Yes/No/Default)
    [Y]>Yes
    Enter the maximum number of recipients per hour from a remote host.
    [100]>1000
    Would you like to specify a custom SMTP limit exceeded response?
    [Y]>
    Enter the SMTP code to use in the response. 452 is the standard code.
    [452]>
    Enter your custom SMTP response. Press Enter on a blank line to finish.
    Too many recipients received this hour
    Would you like to enable Directory Harvest Attack Prevention per host (Yes/No/Default) [ ]>Y
    Enter the maximum number of invalid recipients per hour from a remote host.
    [10]>

---

In addition, an optional web interface can be used by the user to configure directory harvest attack prevention, along with other features as described herein.

O. Example System Performance Characteristics

The following example system performance characteristics provide an indication of the performance of the email message monitoring system, although other implementations can have widely different performance characteristics than those provided herein. Thus, the following is to be considered in an exemplary sense of the possible capabilities of the approaches described herein.

Assume that an email system receives email messages from 1000 different IP addresses in a given minute-long period. For such a mail flow, the process of counting bytes and messages by IP address slows the transfer rate of email messages by about two tenths of one percent (e.g., the message processing latency is determined by: time_with_counting<1.002*time_no_counting).

Other system performance characteristics of this exemplary system include, but are not limited to, the following:

1. Ability to track 500,0000 unique IP addresses and 500,000 unique domain names in daily database.
2. Ability to track 1000 unique IP address in a 10-second interval.
3. Algorithm(s) support O(n*log(n)) as the number network addresses.
4. Background copy of counters from memory to disk consumes no more than 1 percent of CPU.
5. Total background aggregation (including copy to disk) consumes no more than 3 percent of CPU.
6. Memory usage no more than 1000 bytes per network address per interval (includes both IP-indexed database and domain-name-indexed database).
7. 15 megabytes of RAM used by the email message monitor in typical system.
8. At most 50 megabytes of RAM used by email message monitor.

V. Hardware Overview

A. General Hardware Overview

The approach for monitoring email messages received at a sender described herein may be implemented in a variety of ways and the invention is not limited to any particular implementation. The approach may be integrated into an email system or a mail transfer agent (MTA), or may be implemented as a stand-alone mechanism. Furthermore, the approach may be implemented in computer software, hardware, or a combination thereof.

Figure 5:
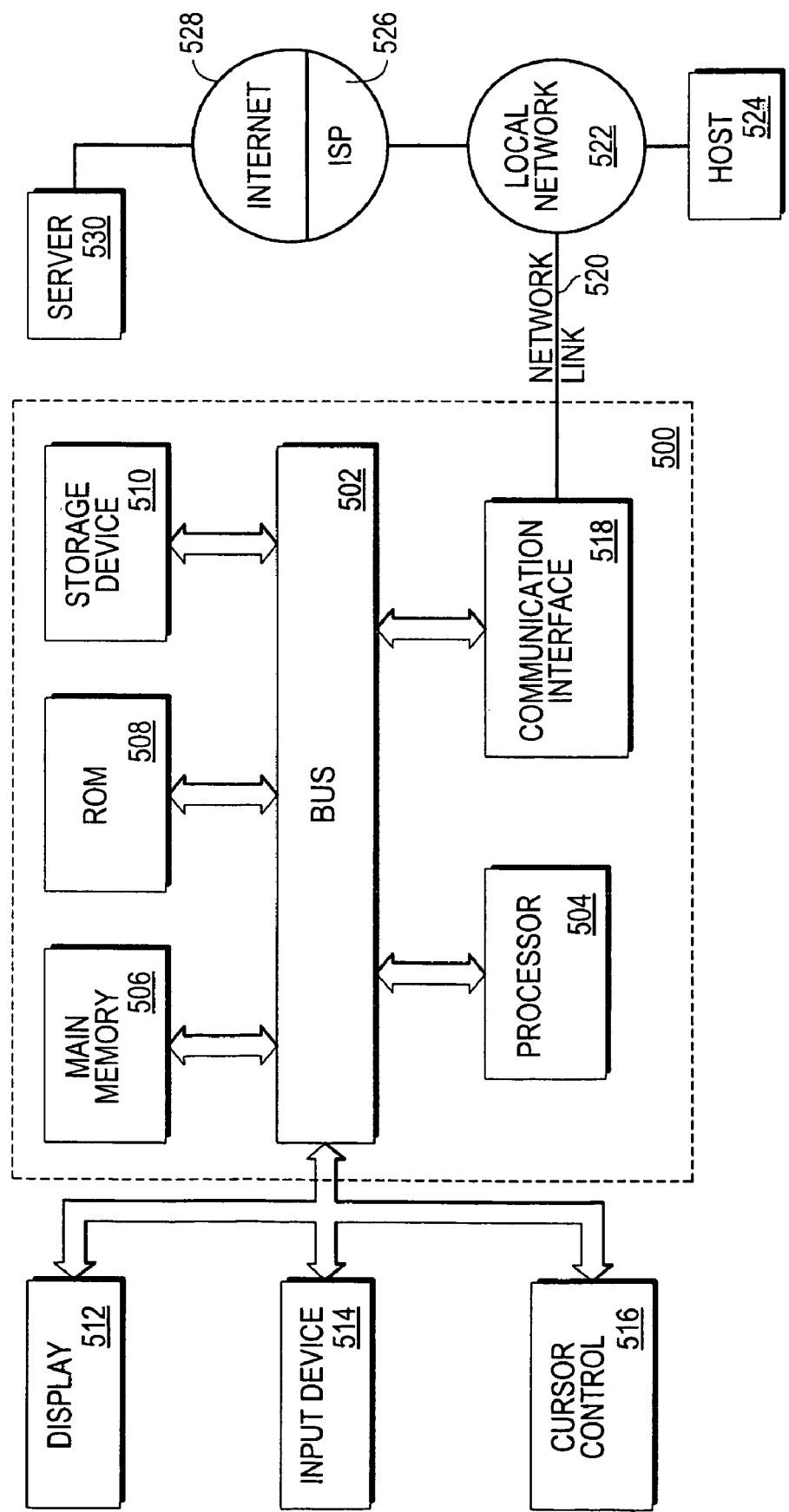
FIG. 5 is a block diagram that depicts a computer system upon which embodiments of the invention may be implemented.

FIG. 5 is a block diagram that depicts a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

B. Hardware Examples

The techniques disclosed herein can be implemented on devices that are used as a mail server between one network and another, such as between the network of a company and the Internet. Such devices may be referred to as mail gateway appliances (MGA's) because they act as a gateway between the networks and act as a mail server for sending and receiving email messages. As examples, the IronPort A-Series Appliances and C-Series Appliances produced by IronPort Systems, Inc., of San Bruno, Calif., can be used to implement one or more of the techniques described herein. These appliances are described in more detail below. However, the techniques described herein can be used with any suitable mechanism, not just IronPort's MTA's or any other manufacturer's MTA's.

The IronPort A-Series family includes two mail transport agents, the A30 and A60, which provide high performance email delivery to a large number of recipients, such as for commercial email delivery of transaction confirmations or customer newsletters. The A30 can deliver 600,000 email messages per hour, and the A60 can deliver 1,000,000 messages per hour, both of which are much greater than can be achieved by traditional open-source mail transport agents (MTAs), such as general-purpose servers running sendmail or qmail. Mail transport agents such as the IronPort A-Series family of Messaging Gateway Appliances™ are sometimes referred to as "injectors" because such mail transport agents inject messages into another mail transport agents, such as by sending email through the Internet from a sender that is associated with one mail transport agent to a recipient that is associated with another mail transport agent.

The IronPort C-Series family includes three email security appliances, the C10, C30 and C60, which provide threat protection, block spam and viruses, and enable corporate email policy enforcement. The email security appliances in the C-Series family are deployed between an organization's firewall and groupware servers, such as Exchange™, Notes™, and GroupWise™, to power and protect email flowing in from or out to the Internet.

The different A-Series and C-Series appliances include some or all of the following IronPort technologies: Stackless Threads™, I/O-Driven Scheduling™, AsyncFS™, Reputation Filters™, and SenderBase™.

The IronPort Stackless Threads™ technology allows a C-series email security appliance to handle up to 10,000 simultaneous connections. With Stackless Threads, each thread is allocated memory as needed, in contrast to traditional approaches in which each thread is allocated a fixed and dedicated memory stack that is typically very generous to avoid stack overflow errors. The allocation of memory on an as needed basis with Stackless Threads more efficiently uses memory and increases concurrency while eliminating the risk of security holes and system crashes from stack overflows.

The IronPort I/O-Driven Scheduling™ technology optimally schedules service for each connection. As with Stackless Threads, IronPort's I/O Driven Scheduling allocates system resources as needed. Tasks are scheduled around the availability of transmission control protocol (TCP) connections for reading or writing, so that when a TCP connection becomes available, I/O-Driven Scheduling grants system resources to the associated task until such time as the connection is no longer capable of I/O. This approach avoids the needless rotation through multiple tasks that is characteristic of traditional preemptive multitasking operating systems in which a scheduler cycles through each task to ensure that no task is starved and to allocate a predetermined time slice of the CPU. Such traditional approaches are inefficient for Internet message delivery that is typically not bound by CPU processing, and thus the traditional approaches incur a substantial performance decrease due to excessive context switching. In addition, with I/O-Driven Scheduling, the thread switches happen at the completion of an I/O read or write, so that threads are not left hanging in the middle of an operation and the memory management in each thread is simplified.

The IronPort AsyncFS™ technology provides an asynchronous file system, which is optimized for message queuing. In traditional messaging systems, each message is allocated a separate and unique file that must be written, read, and deleted. Managing these files in traditional approaches becomes prohibitive when receiving hundreds of thousands of messages per hour, and in addition, modifying any file involves multiple disk accesses to update data within a file and multiple disk accesses to update inodes (e.g., maps of pointers to each bloc of data within a file that are stored on disk). With AsyncFS, messages are stored in batches, not individual files, which reduces the number of basic read/write operations. Furthermore, each queue data structure, which governs the order of message delivery, doubles as an inode that maps where messages are stored on disk. These "inode queues" are stored in RAM instead of on disk, further reducing the read/write operations. In the event of a system disruption or failure that removes the inode queues from RAM, AsyncFS reads message data from disk as it rebuilds the inode queues in RAM and resume message delivery.

IronPort's Reputation Filters™ are used to intelligently throttle, or even block, suspicious senders. The appliance receives inbound mail and performs a threat assessment of the sender, resulting in a reputation score generated by SenderBase, as described below. The appliance then applies mail flow policies that are specified by an administrator to the inbound mail based on the reputation score. More suspicious senders are automatically throttled or blocked, and recognized senders (e.g., customers or corporate partners) are granted more generous policies, such as bypassing spam filters, larger message sizes, and TLS encryption. Reputation Filters™ allow for a flexible response, thereby minimizing the effects of denial of service attacks, directory harvest attacks, and fraudulent mail, along with reducing false positives.

IronPort's Reputation Filters™ work with SenderBase™, a sender reputation service created by IronPort, and Bonded Sender™, an email certification program created by IronPort. SenderBase provides objective data about the identity of email senders to allow email administrators to identify and block IP addresses from which unsolicited commercial email originates or to verify the authenticity of legitimate incoming email from business partners, customers, or other important sources. SenderBase includes an open database that has been adopted by more than 13,000 ISPs, corporations, and universities. SenderBase processes queries for more than 500 million messages per day to provide a real-time view into the global volume of mail being sent by any given IP address. SenderBase measures other parameters, such as whether an IP address is an open proxy, if mail receivers are sending spam complaints about the IP address, if its DNS resolves properly and accepts return mail, its country of origin, and its presence on a variety of blacklists. The parameters are used as input to a statistical algorithm that scores the reputation of the sender: on a scale of −10 to +10.

The different A-Series and C-Series appliances include one or both of the following non-IronPort technologies: the Sophos™ anti-virus technology and the Brightmail™ anti-spam technology.

The C-Series appliances and optionally the A60 appliance include the Sophos™ anti-virus technology. Sophos employs multiple techniques to detect and clean all major forms of viruses, including advanced emulation technology to detect polymorphic viruses and an on-line decompressor for scanning multi-layer attachments. Administrators can take any of several actions to handle messages that are identified as being infection by Sophos. For example, actions include cleaning the message, dropping the attachment, modifying the subject header, deleting the entire infected message, sending an optional notification, or a combination of these actions. The Sophos engine shares information with the IronPort C-Series Mail Flow Monitor to provide real-time and historical reports. During a virus outbreak, the period from the start of the outbreak until an anti-virus identify file is deployed can be covered by IronPort's content scanning technology to identify viruses based on known patterns, or messages can be deleted or archived until new identity files are updated.

The C-Series IronPort appliances include the Brightmail™ anti-spam technology, which is optimized to work with IronPort's AsyncOS™. Brightmail uses real-time methods to identify spam through Brightmail's Probe Network™ and generates approximately 30,000 new rules a day. Automatic rule updates are used, with rules automatically downloaded from the Brightmail servers typically every ten minutes to provide real-time protection. Administrators can take any of several actions to handle messages that are flagged as spam by Brightmail. The actions include sending the messages to a per-recipient web quarantine, marking up the subject header, adding an additional "X-header," sending the message to an alternate folder in the user's mailbox, deleting or bouncing the message, or a combination of these actions. The Brightmail system shares information with the IronPort C-Series Mail Flow Monitor to provide real-time and historical reports that are available at anytime.

VI. Extensions and Alternatives

In the foregoing description, the invention has been described with reference to specific embodiments thereof. It will, however, be evident that various modifications and changes may be made thereto without departing from the broader spirit and scope of the invention. For example, although examples have illustrated the use of network addresses and IP addresses as a particular type of network address, these types of sender identifiers are used for explanation purposes only and embodiments of the invention are not limited to any particular type of network address or more generally any type of sender identifier. As another example, while the examples are described with reference to email or email messages, the approaches described herein can be applied to any type of electronic message, not just email messages. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method for monitoring electronic messages received at a server, comprising:
   determining message information for a plurality of electronic messages that is received at said server, wherein the message information includes a plurality of network addresses associated with the plurality of messages;
   storing said message information in a first in-memory object, wherein the first in-memory object is stored in volatile memory and associated with a first time interval;
   storing said first in-memory object in a queue;
   in response to detecting the expiration of the first time interval associated with the first in-memory object:
      creating a second in-memory object associated with a second time interval;
      based on said first in-memory object, and in response to determining that the first time interval is the oldest time interval for which aggregation has not been performed, aggregating the message information for the first time interval stored in the first in-memory object, generating first aggregate information for a particular network address of the plurality of network addresses, wherein said particular network address is included in said message information for one or more electronic messages of said plurality of electronic messages;
      storing the first aggregate information associated with the first time interval in non-volatile memory and removing the first in-memory object associated with the first time interval from the queue;
   displaying said first aggregate information for said first time interval; and
   wherein the method is performed by one or more computing devices.

2. A method as recited in claim 1, wherein said plurality of electronic messages is a first plurality of electronic messages, and the method further comprises:
   determining additional message information for a second plurality of electronic messages that is received at said server after said first plurality of electronic messages is received at said server;
   storing said additional message information in the second in-memory object associated with a second time interval;
   storing said second in-memory object in said queue;
   based on said second in-memory object, and in response to determining that the second time interval is the oldest time interval for which aggregation has not been performed, aggregating the additional message information for the second time interval stored in the second in-memory object, generating second aggregate information for said particular network address of said plurality of network addresses, wherein said particular network address is included in said additional message information for one or more electronic messages of said second plurality of electronic messages; and
   displaying both at least a portion of said first aggregate information and second aggregate information.

3. A method as recited in claim 1, further comprising:
   receiving, from a user, input that is associated with said particular network address; and
   based on said input, modifying how one or more future electronic messages received at said server from said particular network address are handled by said server.

4. A method as recited in claim 3, wherein modifying how said one or more future electronic messages are handled by said server includes performing one action selected from the group consisting of (a) blocking future electronic messages received at said server from said particular network address, (b) allowing future electronic messages received at said server from said particular network address, and (c) allowing some future electronic messages received at said server from said particular network address and blocking other future electronic messages received at said server from said particular network address.

5. A method as recited in claim 1, wherein said message information includes a particular counter that is selected from the group consisting of (a) a first counter that indicates how many electronic messages are received at said server from said particular network address, (b) a second counter that indicates how many bytes are received at said server from said particular network address, (c) a third counter that indicates how many recipients are identified in electronic messages that are received at said server from said particular network address, and (d) a counter that indicates how many connections are received by said server from said particular network address.

6. A method as recited in claim 2, further comprising:
   determining that a policy has been applied to one or more electronic messages of said plurality of electronic messages;
   generating aggregate policy information for said particular network address, wherein said aggregate policy information is generated for the first and second time intervals, and wherein said aggregate policy information indicates how many times said policy has been applied to electronic messages from said particular network address; and
   displaying said aggregate policy information for said first and second time intervals.

7. A method as recited in claim 6, wherein said policy is selected from the group consisting of a blacklist policy, a whitelist policy, a greylist policy, a spam policy, and a virus policy.

8. A method as recited in claim 1, further comprising:
   based on said message information, generating combined aggregate information for at least two network addresses of said plurality of network addresses over each time interval of said plurality of time intervals, wherein said combined aggregate information is based on said aggregate information for each network address of said at least two network addresses; and
   displaying said combined aggregate information for said plurality of time intervals.

9. A method as recited in claim 8, wherein:
   each IP address of said at least two network addresses is associated with an identifier that is determined based on said message information for said each network address of said at least two network addresses; and
   said identifier is selected from the group consisting of a network address, an Internet Protocol (IP) address, a partial IP address, a range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a range of reputation scores.

10. A method as recited in claim 1, further comprising:

for said particular network address of said plurality of network addresses, determining an average number of electronic messages received at said server from said particular network address over a specified time interval, based on aggregate information for said particular network address for two or more previous specified time intervals;

for said particular network address, determining a current number of electronic messages received at said server from said particular network address over said specified time interval; and displaying a comparison of said average number of electronic messages to said current number of electronic messages.

11. A machine-readable volatile or non-volatile storage medium carrying one or more sequences of instructions for monitoring electronic messages received at a server, wherein execution of the one or more sequences of instructions by one or more processors causes the one or more processors to perform the steps of:

determining message information for a plurality of electronic messages that is received at said server, wherein the message information includes a plurality of network addresses associated with the plurality of messages;

storing said message information in a first in-memory object, wherein the first in-memory object is stored in volatile memory and associated with a first time interval;

storing said first in-memory object in a queue;

in response to detecting the expiration of the first time interval associated with the first in-memory object:

creating a second in-memory object associated with a second time interval;

based on said first in-memory object, and in response to determining that the first time interval is the oldest time interval for which aggregation has not been performed, aggregating the message information for the first time interval stored in the first in-memory object, generating first aggregate information for a particular network address of the plurality of network addresses, wherein said particular network address is included in said message information for one or more electronic messages of said plurality of electronic messages;

storing the first aggregate information associated with the first time interval in non-volatile memory and removing the first in-memory object associated with the first time interval from the queue; and displaying said aggregate information for said first time interval.

12. A machine-readable medium as recited in claim 11, wherein said plurality of electronic messages is a first plurality of electronic messages, and the machine-readable medium further comprises instructions which, when executed by the one or more processors, cause the one or more processors to perform the steps of:

determining additional message information for a second plurality of electronic messages that is received at said server after said first plurality of electronic messages is received at said server;

storing said additional message information in the second in-memory object associated with a second time interval;

storing said second in-memory object in said queue;

based on said second in-memory object, and in response to determining that the second time interval is the oldest time interval for which aggregation has not been performed, aggregating the additional message information for the second time interval stored in the second in-memory object, generating second aggregate information for said particular network address of said plurality of network addresses, wherein said particular network address is included in said additional message information for one or more electronic messages of said second plurality of electronic messages; and displaying both at least a portion of said first aggregate information and second aggregate information.

13. A machine-readable medium as recited in claim 11, further comprising instructions which, when executed by the one or more processors, cause the one or more processors to perform the steps of:

receiving, from a user, input that is associated with said particular network address; and based on said input, modifying how one or more future electronic messages received at said server from said particular network address are handled by said server.

14. A machine-readable medium as recited in claim 13, wherein the instructions for modifying how said one or more future electronic messages are handled by said server further comprise instructions which, when executed by the one or more processors, cause the one or more processors to perform the step of performing one action selected from the group consisting of (a) blocking future electronic messages received at said server from said particular network address, (b) allowing future electronic messages received at said server from said particular network address, and (c) allowing some future electronic messages received at said server from said particular network address and blocking other future electronic messages received at said server from said particular network address.

15. A machine-readable medium as recited in claim 11, wherein said message information includes a particular counter that is selected from the group consisting of (a) a first counter that indicates how many electronic messages are received at said server from said particular network address, (b) a second counter that indicates how many bytes are received at said server from said particular network address, (c) a third counter that indicates how many recipients are identified in electronic messages that are received at said server from said particular network address, and (d) a counter that indicates how many connections are received by said server from said particular network address.

16. A machine-readable medium as recited in claim 12, further comprising instructions which, when executed by the one or more processors, cause the one or more processors to perform the steps of:

determining that a policy has been applied to one or more electronic messages of said plurality of electronic messages;

generating aggregate policy information for said particular network address, wherein said aggregate policy information is generated for the first and second time intervals, and wherein said aggregate policy information indicates how many times said policy has been applied to electronic messages from said particular network address; and displaying said aggregate policy information for said first and second time intervals.

17. A machine-readable medium as recited in claim 16, wherein said policy is selected from the group consisting of a blacklist policy, a whitelist policy, a greylist policy, a spam policy, and a virus policy.

18. A machine-readable medium as recited in claim 11, further comprising instructions which, when executed by the one or more processors, cause the one or more processors to perform the steps of:

based on said message information, generating combined aggregate information for at least two network addresses of said plurality of network addresses over each time interval of said plurality of time intervals, wherein said combined aggregate information is based on said aggregate information for each network address of said at least two network addresses; and displaying said combined aggregate information for said plurality of time intervals.

19. A machine-readable medium as recited in claim 18, wherein:

each IP address of said at least two network addresses is associated with an identifier that is determined based on said message information for said each network address of said at least two network addresses; and said identifier is selected from the group consisting of a network address, an Internet Protocol (IP) address, a partial IP address, a range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a range of reputation scores.

20. A machine-readable medium as recited in claim 11, further comprising instructions which, when executed by the one or more processors, cause the one or more processors to perform the steps of:

for said particular network address of said plurality of network addresses, determining an average number of electronic messages received at said server from said particular network address over a specified time interval, based on aggregate information for said particular network address for two or more previous specified time intervals;

for said particular network address, determining a current number of electronic messages received at said server from said particular network address over said specified time interval; and displaying a comparison of said average number of electronic messages to said current number of electronic messages.

21. An apparatus comprising:

a processor; and a memory coupled to the processor, the memory containing one or more sequences of instructions for monitoring electronic messages received at a server, wherein execution of the one or more sequences of instructions by the processor causes the processor to perform the steps of:

determining message information for a plurality of electronic messages that is received at said server, wherein the message information includes a plurality of network addresses associated with the plurality of messages;

storing said message information in a first in-memory object, wherein the first in-memory object is stored in volatile memory and associated with a first time interval;

storing said first in-memory object in a queue;

in response to detecting the expiration of the first time interval associated with the first in-memory object:

creating a second in-memory object associated with a second time interval;

based on said first in-memory object, and in response to determining that the first time interval is the oldest time interval for which aggregation has not been performed, aggregating the message information for the first time interval stored in the first in-memory object, generating first aggregate information for a particular network address of the plurality of network addresses, wherein said particular network address is included in said message information for one or more electronic messages of said plurality of electronic messages;

storing the first aggregate information associated with the first time interval in non-volatile memory and removing the first in-memory object associated with the first time interval from the queue; and displaying said first aggregate information for said of first time interval.

22. An apparatus as recited in claim 21, wherein said plurality of electronic messages is a first plurality of electronic messages, and wherein the memory further contains one or more sequences of instructions which, when executed by the processor, cause the processor to perform the steps of:

determining additional message information for a second plurality of electronic messages that is received at said server after said first plurality of electronic messages is received at said server;

storing said additional message information in the second in-memory object associated with a second time interval;

storing said second in-memory object in said queue;

based on said second in-memory object, and in response to determining that the second time interval is the oldest time interval for which aggregation has not been performed, aggregating the additional message information for the second time interval stored in the second in-memory object, generating second aggregate information for said particular network address of said plurality of network addresses, wherein said particular network address is included in said additional message information for one or more electronic messages of said second plurality of electronic messages; and displaying both at least a portion of said first aggregate information and second aggregate information.

23. An apparatus as recited in claim 21, wherein the memory further contains one or more sequences of instructions which, when executed by the processor, cause the processor to perform the steps of:

receiving, from a user, input that is associated with said particular network address; and based on said input, modifying how one or more future electronic messages received at said server from said particular network address are handled by said server.

24. An apparatus as recited in claim 23, wherein the instructions for modifying how said one or more future electronic messages are handled by said server further comprise instructions which, when executed by the processor, cause the processor to perform the step of performing one action selected from the group consisting of (a) blocking future electronic messages received at said server from said particular network address, (b) allowing future electronic messages received at said server from said particular network address, and (c) allowing some future electronic messages received at said server from said particular network address and blocking other future electronic messages received at said server from said particular network address.

25. An apparatus as recited in claim 21, wherein said message information includes a particular counter that is selected from the group consisting of (a) a first counter that indicates how many electronic messages are received at said server from said particular network address, (b) a second counter that indicates how many bytes are received at said server from said particular network address, (c) a third counter that indicates how many recipients are identified in electronic messages that are received at said server from said particular network address, and (d) a counter that indicates how many connections are received by said server from said particular network address.

26. An apparatus as recited in claim 22, wherein the memory further contains one or more sequences of instructions which, when executed by the processor, cause the processor to perform the steps of:
   determining that a policy has been applied to one or more electronic messages of said plurality of electronic messages;
   generating aggregate policy information for said particular network address, wherein said aggregate policy information is generated for the first and second time intervals, and wherein said aggregate policy information indicates how many times said policy has been applied to electronic messages from said particular network address; and
   displaying said aggregate policy information for said first and second time intervals.

27. An apparatus as recited in claim 26, wherein said policy is selected from the group consisting of a blacklist policy, a whitelist policy, a greylist policy, a spam policy, and a virus policy.

28. An apparatus as recited in claim 21, wherein the memory further contains one or more sequences of instructions which, when executed by the processor, cause the processor to perform the steps of:
   based on said message information, generating combined aggregate information for at least two network addresses of said plurality of network addresses over each time interval of said plurality of time intervals, wherein said combined aggregate information is based on said aggregate information for each network address of said at least two network addresses; and
   displaying said combined aggregate information for said plurality of time intervals.

29. An apparatus as recited in claim 28, wherein:
   each IP address of said at least two network addresses is associated with an identifier that is determined based on said message information for said each network address of said at least two network addresses; and
   said identifier is selected from the group consisting of a network address, an Internet Protocol (IP) address, a partial IP address, a range of IP addresses, a primary domain, a subdomain, a fully qualified domain name (FQDN), a partial FQDN, a classless inter-domain routing (CIDR) block, a partial CIDR block, a subnet, an organization identifier, a network owner, a reputation score, and a range of reputation scores.

30. An apparatus as recited in claim 21, wherein the memory further contains one or more sequences of instructions which, when executed by the processor, cause the processor to perform the steps of:
   for said particular network address of said plurality of network addresses, determining an average number of electronic messages received at said server from said particular network address over a specified time interval, based on aggregate information for said particular network address for two or more previous specified time intervals;
   for said particular network address, determining a current number of electronic messages received at said server from said particular network address over said specified time interval; and
   displaying a comparison of said average number of electronic messages to said current number of electronic messages.

31. The method of claim 1, wherein the oldest time interval for which aggregation has not been performed is the only time interval for which aggregation has not been performed.

32. The machine-readable medium of claim 11, wherein the oldest time interval for which aggregation has not been performed is the only time interval for which aggregation has not been performed.

33. The apparatus of claim 21, wherein the oldest time interval for which aggregation has not been performed is the only time interval for which aggregation has not been performed.

* * * * *

UNITED STATES PATENT AND TRADEMARK OFFICE
CERTIFICATE OF CORRECTION

| | | |
|---|---|---|
| PATENT NO. | : 7,870,200 B2 | Page 1 of 1 |
| APPLICATION NO. | : 11/139090 | |
| DATED | : January 11, 2011 | |
| INVENTOR(S) | : Charles S. Slater et al. | |

It is certified that error appears in the above-identified patent and that said Letters Patent is hereby corrected as shown below:

In the Claims:
COLUMN 61,
Claim 11, Line 48 - After "displaying said" and before "aggregate" insert --first--.

COLUMN 64,
Claim 21, Line 12 - After "for said" and before second occurrence of "first," delete "of".

Signed and Sealed this
Twenty-second Day of February, 2011

David J. Kappos
*Director of the United States Patent and Trademark Office*